(12) United States Patent
Degenhardt et al.

(10) Patent No.: US 8,296,727 B2
(45) Date of Patent: *Oct. 23, 2012

(54) SUB-TASK MECHANISM FOR DEVELOPMENT OF TASK-BASED USER INTERFACES

(75) Inventors: Jon Rexford Degenhardt, Mountain View, CA (US); Alvin H. To, Redwood City, CA (US); Yu Sui, San Mateo, CA (US); Sudhakar Kaki, Pleasanton, CA (US); Sanjin Tulac, Mountain View, CA (US); Rahim Mohamed Yaseen, Redwood City, CA (US)

(73) Assignee: Oracle Corporation, Redwood Shores, CA (US)

( * ) Notice: Subject to any disclaimer, the term of this patent is extended or adjusted under 35 U.S.C. 154(b) by 1666 days.

This patent is subject to a terminal disclaimer.

(21) Appl. No.: 11/525,734

(22) Filed: Sep. 22, 2006

(65) Prior Publication Data

US 2007/0283352 A1    Dec. 6, 2007

Related U.S. Application Data

(60) Provisional application No. 60/726,982, filed on Oct. 14, 2005, provisional application No. 60/727,248, filed on Oct. 14, 2005.

(51) Int. Cl.
*G06F 9/44*        (2006.01)
*G06F 3/00*        (2006.01)
*G06F 9/46*        (2006.01)

(52) U.S. Cl. ........ 717/109; 717/100; 717/105; 717/113; 717/125; 715/762; 718/100

(58) Field of Classification Search .................... 717/109
See application file for complete search history.

(56) References Cited

U.S. PATENT DOCUMENTS

| | | | |
|---|---|---|---|
| 5,524,241 A | 6/1996 | Ghoneimy et al. | 707/10 |
| 5,684,998 A | 11/1997 | Enoki et al. | 713/310 |
| 6,122,640 A * | 9/2000 | Pereira | 707/648 |
| 6,353,839 B1 * | 3/2002 | King et al. | 715/236 |
| 6,671,716 B1 | 12/2003 | Diedrichsen et al. | 707/E17.119 |
| 6,741,967 B1 * | 5/2004 | Wu et al. | 705/7.32 |
| 6,918,053 B1 | 7/2005 | Thatte et al. | 714/16 |
| 7,315,826 B1 | 1/2008 | Guheen et al. | 705/7 |
| 7,389,361 B2 * | 6/2008 | Major et al. | 709/246 |
| 7,548,898 B1 | 6/2009 | Tarenskeen et al. | 707/1 |
| 7,640,548 B1 * | 12/2009 | Yu et al. | 718/106 |
| 7,681,133 B2 * | 3/2010 | Yaseen et al. | 715/740 |
| 2001/0044738 A1 * | 11/2001 | Elkin et al. | 705/8 |

(Continued)

OTHER PUBLICATIONS

Paul De Bra et al., "A Formal Approach to Analyzing the Browsing Semantics of Hypertext", Proc. of CSN-94 Conference, 1994—Citeseer, total pp. 12.*

(Continued)

*Primary Examiner* — Don Wong
*Assistant Examiner* — Marina Lee
(74) *Attorney, Agent, or Firm* — Campbell Stephenson LLP

(57) ABSTRACT

In one embodiment, a method for handling subtasks within a business task includes providing a plurality of user interfaces (UIs) pertaining to the business task having at least one subtask step. The subtask step has a subtask defined within the business task by an intermediate user to reuse a portion of another business task. The method further includes allowing an end user to navigate back and forth through the plurality of UIs.

19 Claims, 19 Drawing Sheets

U.S. PATENT DOCUMENTS

| | | | | |
|---|---|---|---|---|
| 2001/0044751 | A1 | 11/2001 | Pugliese et al. | 705/26 |
| 2002/0111949 | A1 | 8/2002 | Barga et al. | 707/10 |
| 2003/0204503 | A1* | 10/2003 | Hammer et al. | 707/6 |
| 2004/0015851 | A1* | 1/2004 | Newhook et al. | 717/116 |
| 2004/0054644 | A1 | 3/2004 | Ganesh et al. | 707/1 |
| 2004/0181560 | A1 | 9/2004 | Romanufa et al. | 707/202 |
| 2004/0181775 | A1 | 9/2004 | Anonsen et al. | 717/104 |
| 2004/0255182 | A1 | 12/2004 | Lomet et al. | 714/2 |
| 2005/0038687 | A1 | 2/2005 | Galdes | 705/9 |
| 2005/0149376 | A1 | 7/2005 | Guyan et al. | 705/9 |
| 2005/0160398 | A1 | 7/2005 | Bjornson et al. | 717/104 |
| 2005/0187983 | A1 | 8/2005 | Narang et al. | 707/200 |
| 2005/0193286 | A1 | 9/2005 | Thatte et al. | 714/48 |
| 2005/0198564 | A1 | 9/2005 | Sinzig et al. | 715/507 |
| 2005/0262112 | A1 | 11/2005 | Moore | 707/100 |
| 2006/0074735 | A1* | 4/2006 | Shukla et al. | 705/8 |
| 2006/0095274 | A1 | 5/2006 | Phillips et al. | 705/1 |
| 2006/0143034 | A1 | 6/2006 | Rothermel et al. | 705/1 |
| 2006/0288014 | A1 | 12/2006 | Edwards et al. | 707/100 |
| 2007/0038963 | A1 | 2/2007 | Moore | 707/100 |
| 2007/0226637 | A1* | 9/2007 | Yaseen et al. | 715/762 |
| 2007/0283352 | A1* | 12/2007 | Degenhardt et al. | 718/100 |
| 2011/0093781 | A1* | 4/2011 | Yaseen et al. | 715/709 |

OTHER PUBLICATIONS

Michael Kraus, "A Toolkit for Advanced XML Browsing Functionalities", 2000, retrieved from <http://www.pms.ifi.lmu.de/publikationen/diplomarbeiten/Michael.Kraus/diplomarbeit.pdf> total pp. 96.*

"SQL As Understood by SQLite," http://web.archive.org/web/20050207124742/www.sqlite.org/lang_conflict.html, Feb. 2005, pp. 2.

"SQL Server Books Online." http://web.archive.org/web/20040602065934/http://doc.ddart.net/mssql//sql2000/html/, Jun. 2004, pp. 6.

Noyes, "System. Transactions and connection pooling," http://briannoyes.net/2005/09/14/SystemTransactionsAndConnectionPooling.aspex., Sep. 14, 2005, pp. 4.

* cited by examiner

SUB-TASK MECHANISM FOR DEVELOPMENT OF TASK-BASED USER INTERFACES

RELATED APPLICATIONS

The present application claims priority to U.S. Provisional Application Ser. Nos. 60/726,982 and 60/727,248, both filed Oct. 14, 2005, which are incorporated herein in their entirety.

FIELD OF THE INVENTION

Embodiments of the present invention relate generally to business process modeling, and more particularly to providing a sub-task mechanism for development of user interfaces pertaining to a business task.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2006, Oracle Corp., All Rights Reserved.

BACKGROUND OF THE INVENTION

Business applications allow end users to perform business tasks via designated user interfaces (UIs) or views. With some business applications, end users cannot effectively interact with the UI views unless they understand the logic behind each UI view and how the UI views relate to each other. As a result, end users typically have to go through extensive training before they can start working with the designated UI views.

An expense associated with training can be minimized through the use of an additional tool known as a UI wizard. The UI wizard guides end users through different views, using step-by-step dialogs. The development of a UI wizard is usually done using a procedural or object-oriented programming language by experienced software developers that have thorough understanding of the underlying business logic. If the business logic changes, the wizard code needs to be modified, and then shipped to the customers with a new product release.

SUMMARY OF THE INVENTION

The present invention relates to various aspects of handling subtasks within a business task.

According to one aspect of the present invention, an exemplary method includes providing a plurality of user interfaces (UIs) pertaining to a business task having at least one subtask step. The subtask step has a subtask defined within the business task by an intermediate user to reuse a portion of another business task. The method further includes allowing an end user to navigate back and forth through the plurality of UIs.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE INVENTION

Figure 1A:
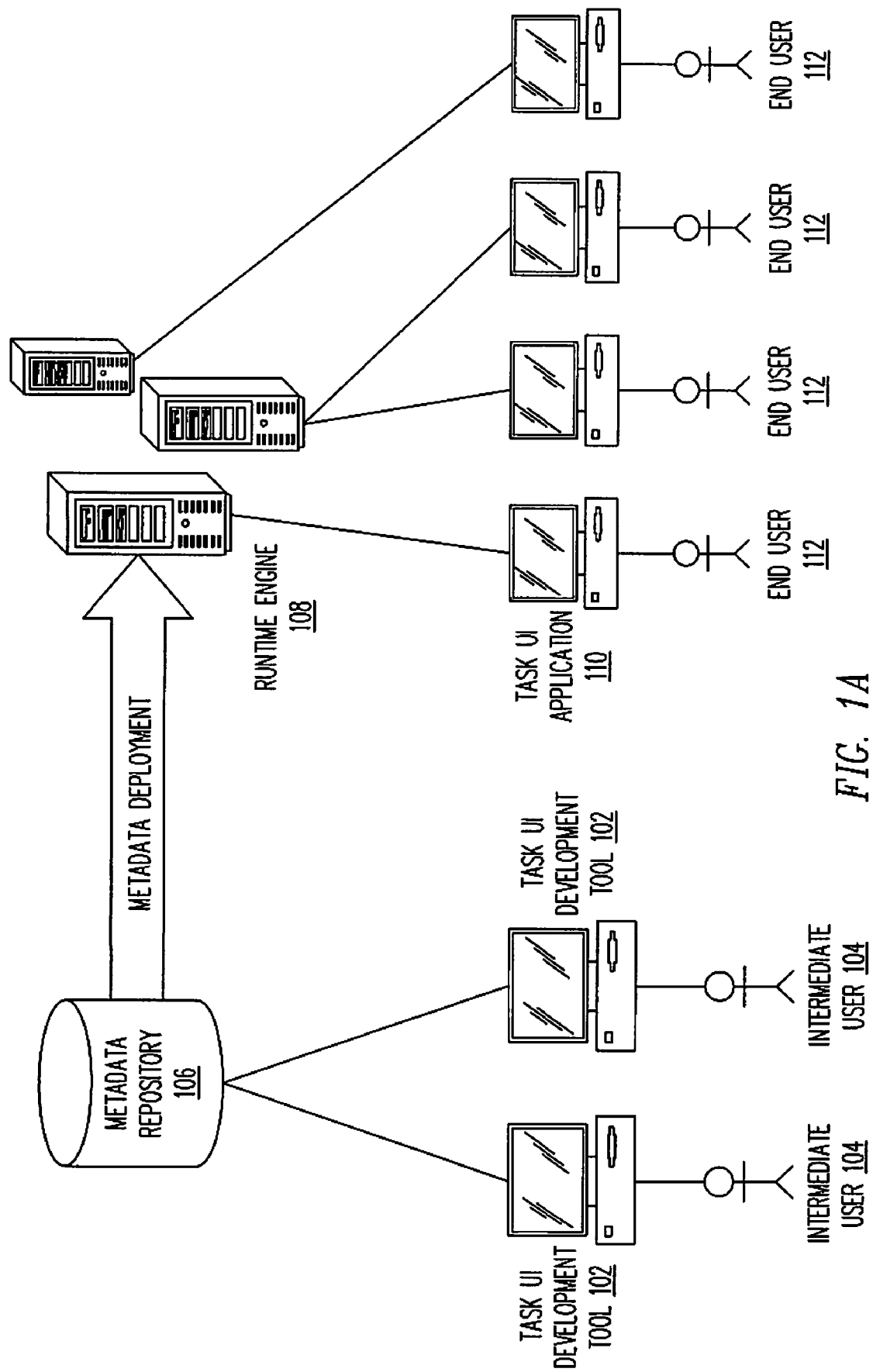
FIG. 1A is a block diagram of one embodiment of a system for building and presenting wizard-style UIs for business tasks.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Embodiments of the present invention relate to various aspects of building wizard-style, guided user interfaces (UIs) for accomplishing business tasks. A business task may support a variety of different processes including, for example, filling out objectives, applying for a loan, conducting a survey, qualifying a lead, approving expense reports, etc. Exemplary problems solved by a task may be as follows:

multiple step transactions that require several independent actions to be completed (or rolled back) as a unit (e.g., balance transfers that credit one account and debit another);

complex multiple step activities (e.g., setting up new user accounts with roles, security and profile information);

multiple step activities dependent on regulatory business logic (e.g., customer authorization steps, acknowledgement of required disclosures, quoting complex products with configuration rules and validation requirements);

data creation activities requiring data quality and duplicate checking (e.g., service requests from gold customers requiring a committed resolution time within 24 hours and scheduling of a call back activity);

decision processes requiring branching logic to determine the appropriate sequence of activities (e.g., presentation of available upgrade or upsell products to a customer based on geography and current products owned by the customer);

guidance or scripting to assist a user during a live interaction when real-time decision making, presentation of supporting information (text and/or graphic) and a consistent message is critical to a successful interaction (e.g., walking a customer through a live portfolio analysis and offer presentation, informing the customer of the sales team that will be handling their inquiry).

The wizard-style task UI is a sequence of task specific UI views that lead an end user to perform process-centric work that may include applying business logic, evaluating conditional fields, external system integration, etc. The result is an improved end-user experience with shorter learning curves and higher task completion rates.

FIG. 1 is a block diagram of one embodiment of a system for building wizard-style U's for business tasks. The system includes a task UI development tool 102, a metadata repository 106 and a runtime engine 108.

The task UI development tool 102 is a declarative tool that allows intermediate users 104 (e.g., business analysts, software developers, etc.) to design wizard-style U's for business tasks without writing any code. The tool 102 enables intermediate users 104 to specify steps of a business task and the execution flow for the steps. The steps may include, for example, UI view steps, database operation steps, decision steps, service (external and/or internal) invocation steps, etc. In one embodiment, the tool 102 allows intermediate users 104 to include reusable modules as individual steps into business tasks. Such steps referred to herein as subtasks include portions of a business task that can be reused. As will be discussed in more detail below, subtasks do not affect the UI behavior seen by end users 112.

The tool 102 may be a graphical editor that allows an intermediate user 104 to create a visual representation of a task that reflects the task steps and their execution flow. In one embodiment, the visual representation of the task is in the form of a flowchart that includes a sequence of steps to be performed for the business task. In one embodiment, the tool 102 enables an intermediate user 104 to define navigation controls for UI view steps of the task. These navigation controls may include, for example, Next/Previous buttons, Pause button, Cancel button, etc.

In one embodiment, the tool 102 also allows an intermediate user 104 to specify properties for the task. These properties may include task-level properties defining characteristics of the task (e.g., the name of the task, transactional behavior, etc.) and step-level properties defining characteristics of individual steps (e.g., fields to be entered by an end user for a UI view step, database fields to be updated for a database operation step, branching conditions for a decision step, the name of a service to be called for a service invocation step, input and output arguments for a subtask step, etc.). An exemplary UI illustrating the operation of one embodiment of the tool 102 will be discussed in more detail below in conjunction with FIG. 1B.

In one embodiment, the tool 102 converts the visual representation of the task and the task properties into a collection of metadata and stores the resulting collection of metadata in the metadata repository 106. In one embodiment, the metadata is represented using an XML document based on an XML schema.

The runtime engine 108 deploys, at runtime, task metadata stored in the metadata repository 106 and processes the task metadata to produce a set of wizard-style U's. The wizard-style U's are presented to end users 112 by task UI applications 110. The end users 112 may be connected or disconnected mobile users. In one embodiment, mobile end users launch and run while operating in disconnected mode. When the end user is connected, any data resulting from completed tasks is synchronized back to the server.

In one embodiment, the runtime engine 108 provides navigation support for walking end users 112 through UI sequences. In particular, end users can progress through tasks by entering data in the UI view and pressing the Next button to move to the next view. End users can also navigate backward in the task (Previous button), modifying previously entered data if desired, then navigating forward again via the Next button. In one embodiment, at the last step in the task, an end user 112 can use the Submit button to commit the task data to the main database tables.

In one embodiment, the runtime engine 108 performs business operations and dynamically controls view sequencing as the task progresses. This allows the execution of the flow to be dynamically modified based on data entered by the end user 112 during the task. The runtime engine 108 can support several types of operations, including, for example, database accesses, business service calls, subtask steps, and decision steps. Since these operations are performed automatically by the runtime engine 108, rather than by an explicit user actions such as button presses, the end user 112 no longer needs to know when to press particular buttons or in which order.

In one embodiment, changes to business data made as part of a task are not committed to the main database until the end-user has successfully completed the task. New and modified data is kept separate from the main database data and is visible only while the task is executing and only to the end user running the task. When the end user completes the task, all data is committed to the main database and made visible to other users in the enterprise.

In one embodiment, the runtime engine 108 allows an end user 112 to pause a task (e.g., using the Pause button) and resume it at a later time. In one embodiment, paused tasks are displayed in the user's Inbox. The Inbox may support resuming paused tasks and transferring tasks to other users. Once the task is transferred, it appears in the Inbox of the user it was transferred to.

In one embodiment, the runtime engine 108 allows an end user 112 to cancel the task (e.g., using the Cancel button) being run by reverting all changes made during the current session and restoring the task to its last paused state. In one embodiment, a task can be deleted entirely from the Inbox, discarding all the work done in the task.

In one embodiment, tasks may operate either as standalone entities, or as an integral part of an overarching business process. For example, a Change Contact Address task is a standalone task because it is a self-contained unit of work initiated by the end user. Another exemplary standalone task initiates a business process upon its completion. For example, a Create Expense Report task may initiate a business process for approving the expense report and paying the expenses. Yet another exemplary standalone task may be embedded in the business process as a Task Step. The Task Step may assign a task to an end user by placing an entry in the user's Inbox where the user can launch it. The business process may wait until the end-user runs and completes the task, at which point the business process would be resumed.

Figure 1B:
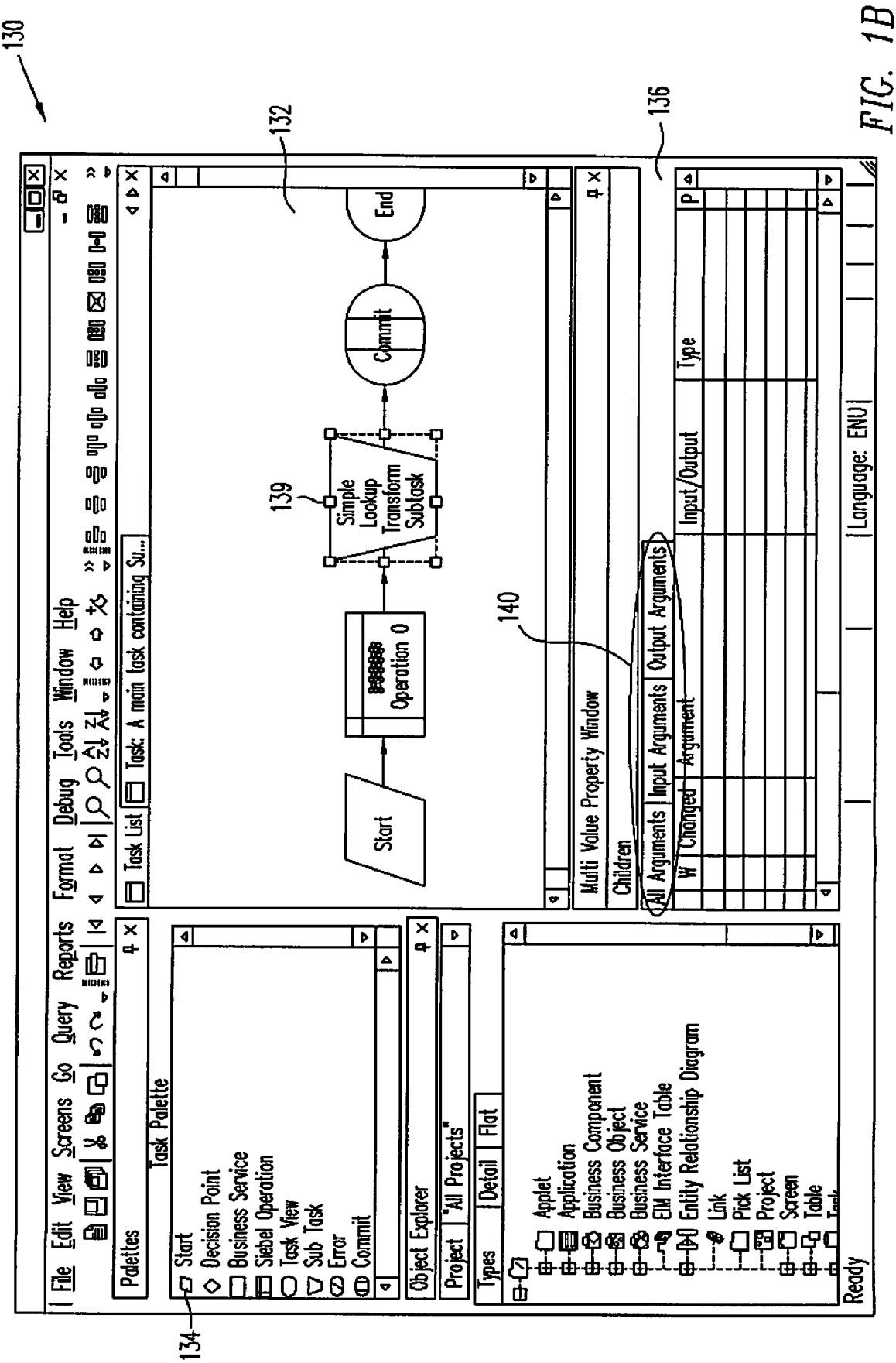
FIGS. 1B and 1C illustrate exemplary U's provided by a task UI development tool according to one embodiment of the present invention.

FIG. 1B illustrates an exemplary UI 130 provided by a task UI development tool according to one embodiment of the present invention.

Referring to FIG. 1B, the UI 130 contains several areas including a task palette area 134, a working area 132 and a property window 136. The area 134 displays a list of different shapes representing various types of task steps and connectors for connecting the steps. Various task step types may include, for example, a task UI view, a database operation, a business service invocation, a decision point, a commit step, an error step, a start step, an end step, and a subtask step. A trapezoid-shaped subtask step 139 executes a subtask, i.e., a portion of a task that was factored out for reuse in other tasks.

An intermediate user can select the desired task steps, drag them to the working area 132, and connect them as needed in the working area 132, creating a flowchart.

The property window 136 allows the intermediate user to specify properties for the task and individual steps. In particular, in FIG. 1B, the property window 136 shows arguments of a subtask step highlighted in the working area 132. A task may include one or more subtask steps. Subtasks may be nested, i.e., a subtask may in turn contain one or more subtask steps. Properties of a subtask step may include input and output arguments 140. Input arguments pass values into the subtask's context; output arguments pass values from the subtask's context back to the parent task's context.

Figure 1C:
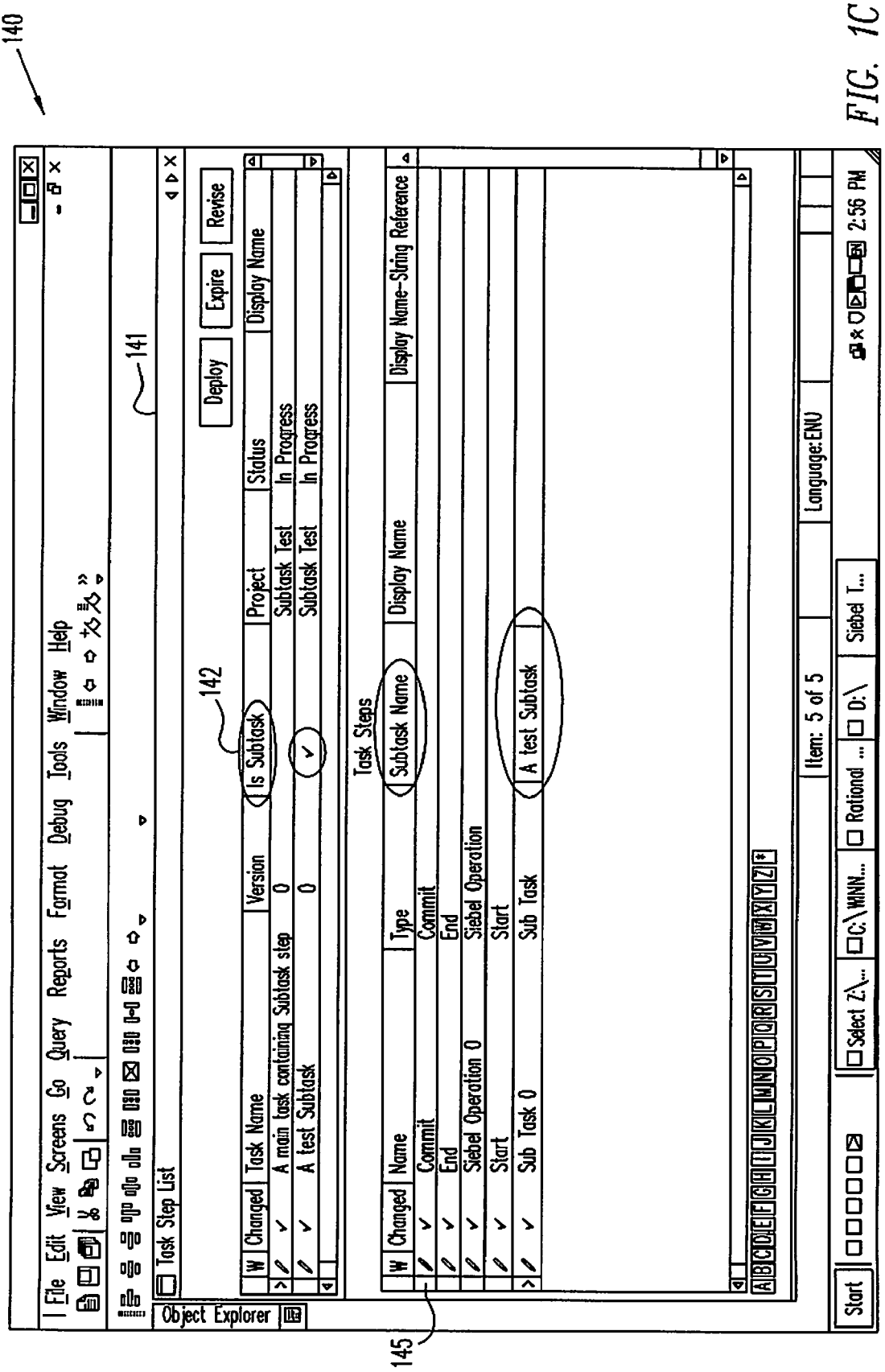

The UI 130 provides a task list tab 138 that allows the intermediate user to view a task list that includes all parent tasks and subtasks. FIG. 1C illustrates an exemplary UI 140 containing a task list of the task displayed in FIG. 1B.

Referring to FIG. 1C, task list 141 includes a parent task and a subtask within the parent task. A flag 142 is provided to allow the intermediate user to identify subtasks at design time. The task step list 145 lists steps of the parent task, including a subtask step having a subtask name.

Figure 1D:
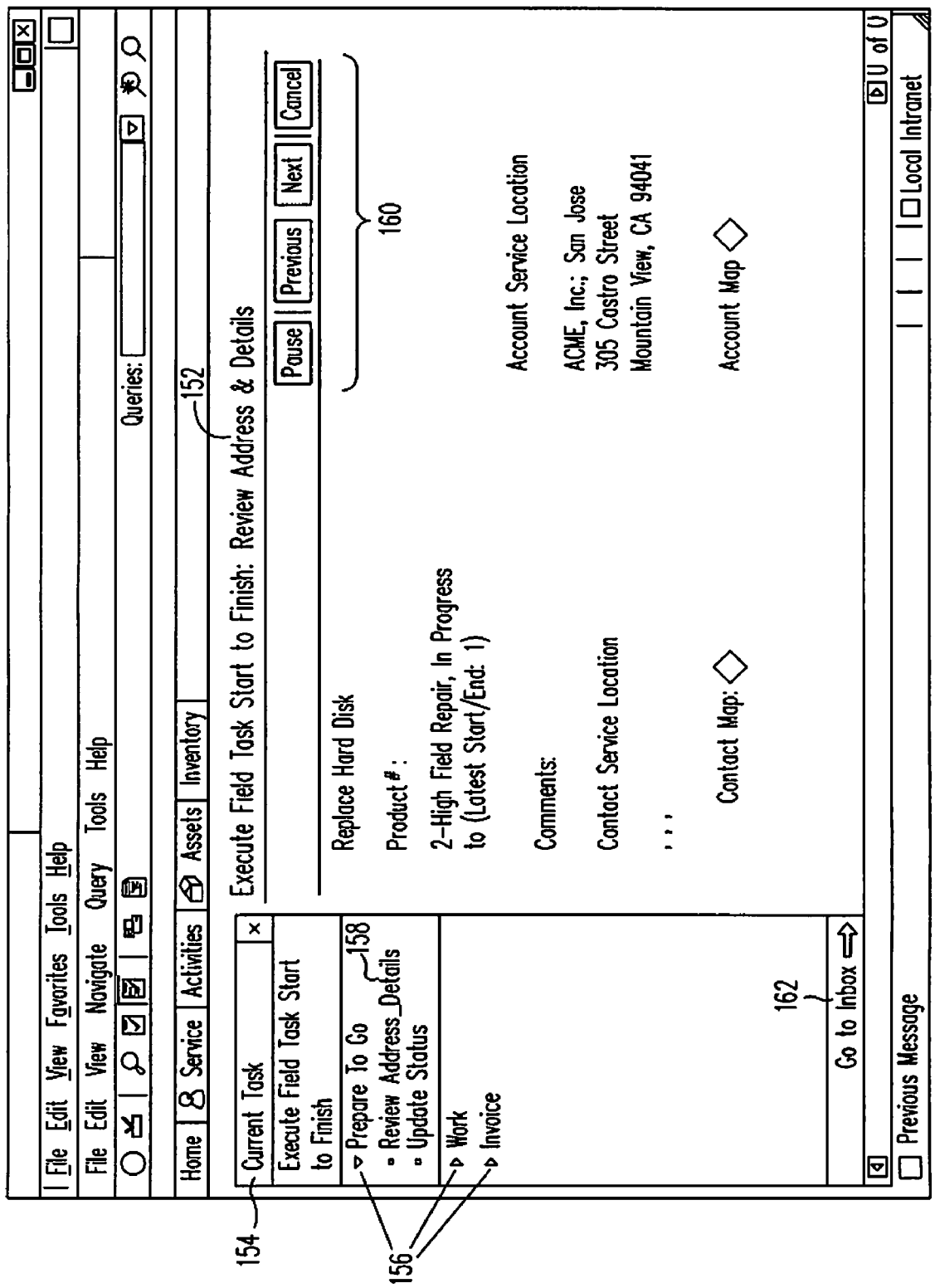
FIG. 1D illustrates an exemplary UI from a wizard-style sequence of task UIs, according to one embodiment of the present invention.

FIG. 1D illustrates an exemplary UI 150 from a wizard-style sequence of task UIs, according to one embodiment of the present invention.

Referring to FIG. 1D, the UI 150 contains a main area 152 that presents the task view called "Review Address & Details." The task view includes one or more applets consisting of UI controls showing the specific presentation for the current step in the task. At the top of the task view is a set of navigational controls 160 that include the Pause, Previous, Next, and Cancel buttons.

A current task area 154 displays the current state of the task, including the task name, chapters 156 in the task, and the names of view steps in the current chapter, including the view step 158 that is being presented in the main area 152. Chapters 156 provide visible division of tasks into groups of steps. In one embodiment, using chapters frees screen space by hiding view steps visited outside of the current chapter. In one embodiment, end users can expand and collapse chapters to see and hide visited view steps, respectively.

Figure 2:
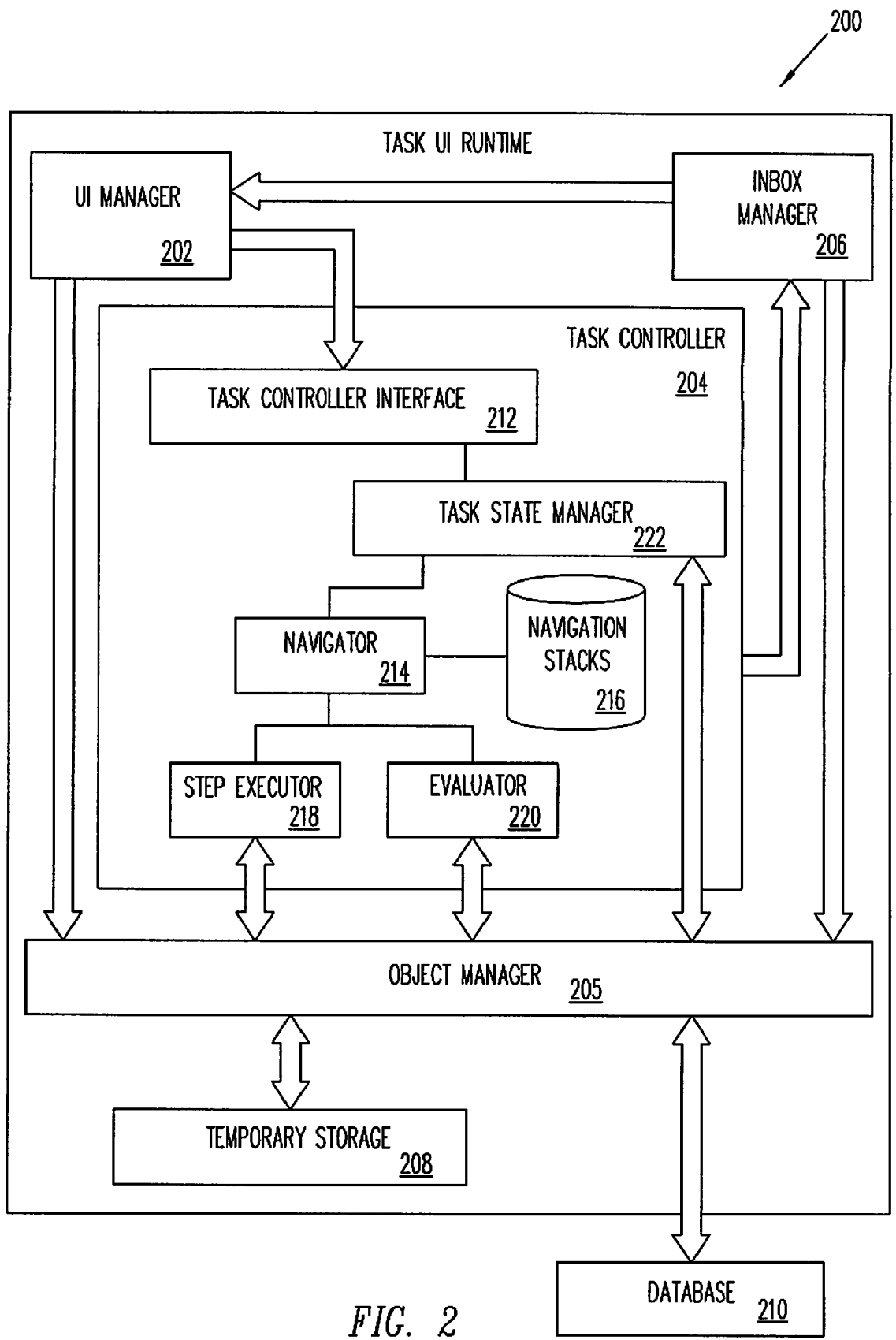
FIG. 2 is a block diagram of one embodiment of a runtime engine.

FIG. 2 is a block diagram of one embodiment of a runtime engine 200. The runtime engine 200 includes a UI manager 202, an Inbox manager 206, a task controller 204, an object manager 205, a temporary storage 208 and a main database 210.

The UI manager 202 is responsible for rendering and presenting wizard-style task U's to end users, and communicating the end user input to the object manager 205 and task controller 204.

The Inbox manager 206 is responsible for controlling new and paused tasks stored in users' Inboxes.

The task controller 204 is responsible for analyzing the metadata pertaining to the task and the end user input, and executing flow and business logic based on this analysis to guide the end user through the business task.

The temporary storage 208 stores data associated with the task throughout the lifetime of the task. In one embodiment, this data is only visible while the task is executing and only to the end user running the task. In another embodiment, the temporary storage 208 may be shared across multiple tasks and their end users. Once an end user successfully completes the task, the data stored in the temporary storage 208 for this task is committed to the database 210 and becomes visible to other users in the organization.

In one embodiment, the task controller 204 includes a task controller interface 212, a navigator 214, a step executor 218, an evaluator 220 and a task state manager 222.

In one embodiment, the task controller interface 212 interacts with the UI manager 202, and invokes appropriate internal components of the task controller 204. In one embodiment, the task controller interface 212 includes one or more APIs to communicate with different entities.

The navigator 214 calls the step executor 218 to execute the step activity, and pushes the step instance into the navigation stack 216.

The navigator 214 is responsible for performing forward and backward navigation. In one embodiment, when at the decision point, the navigator 214 calls the evaluator 220 to evaluate branch condition criteria and determine the forward path. On forward navigation for all other step types, the navigator 214 may call the step executor 218 to execute the activity represented by the step, and push the stack frame into the navigation stack. Each stack frame may contain a reference to the current business object state. The business object is a collection of data associated with particular UI, including data currently entered by the end user. The navigator 214 restores business object states from the navigation stack for the task views during backward navigation.

In one embodiment, the navigator 214 is responsible for handling subtask navigation using the navigation stack and a call stack, which stores local context for the main business task and each subtask within the main business task, as will be discussed in more detail below in conjunction with FIG. 9.

The task state manager 222 is responsible for maintaining the life cycle of task instances and their states. In addition to the navigation stack, task state encompasses the values of all task variables for the current task instance. In one embodiment, the task state manager 222 maintains the life cycle of a task by enforcing its state transition rules.

In one embodiment, the runtime engine 200 also includes an object manager 205 that provides data management for the task controller 204, Inbox manager 206 and the UI manager 202. In one embodiment, the object manager supports transaction isolation for operations performed within the boundary of a task in a manner transparent to its client components. The object manager stores updates associated with these operations in the temporary storage 208 until the task controller 204 calls the object manager to commit the data to the database 210. The task controller 204 may also call the object manager to set data savepoints and rollback the task data to a savepoint when necessary. In one embodiment, the object manager captures the task business object (BO) state, and provides the functionality to store and retrieve BO state from its serialized image and database 210.

An exemplary task execution scenario will now be discussed in more detail with reference to the major components of the runtime engine 200, according to one embodiment of the present invention. The scenario may begin when an end user selects a new or paused task in the Inbox. In response, the Inbox manager 206 calls the UI manager 202, passing the name of the task. The UI manager 202 extracts the task context, and calls the task controller 204 to start a task. Then, the task controller 204 calls the object manager 205 to create the temporary storage 208 for the task. Using the object manager 205, the task controller 204 reads data from the temporary storage 208 and writes data back to the temporary storage 208.

If the next step is a task view step, the task controller 204 exits and returns control to the UI manager 202, passing the name of the next task view. The UI manager 202 renders the task view and stores the user data through the object manager 205 in the temporary storage 208. If the end user activates a navigation control (e.g., by pressing the Next, Previous or Cancel button) in a task UI view, the UI manager 202 calls the task controller 204 passing a navigation operand (e.g., Next, Previous or Cancel). The task controller 204 performs all relevant non-UI related task activities and returns control back to the UI manager 202, providing the name of the subsequent task UI view.

If the user pauses the task, the task controller 204 saves the current task state via the object manager 205 to the database 210, bypassing the temporary storage 208. The UI data remains in the temporary storage. If the user finishes the task, the task controller 204 issues a commit to the object manager 205, which saves the UI data permanently from temporary storage 208 to database 210. Depending on whether the task is paused or completed, the task controller 204 may update or remove the task from the Inbox.

Figure 3:
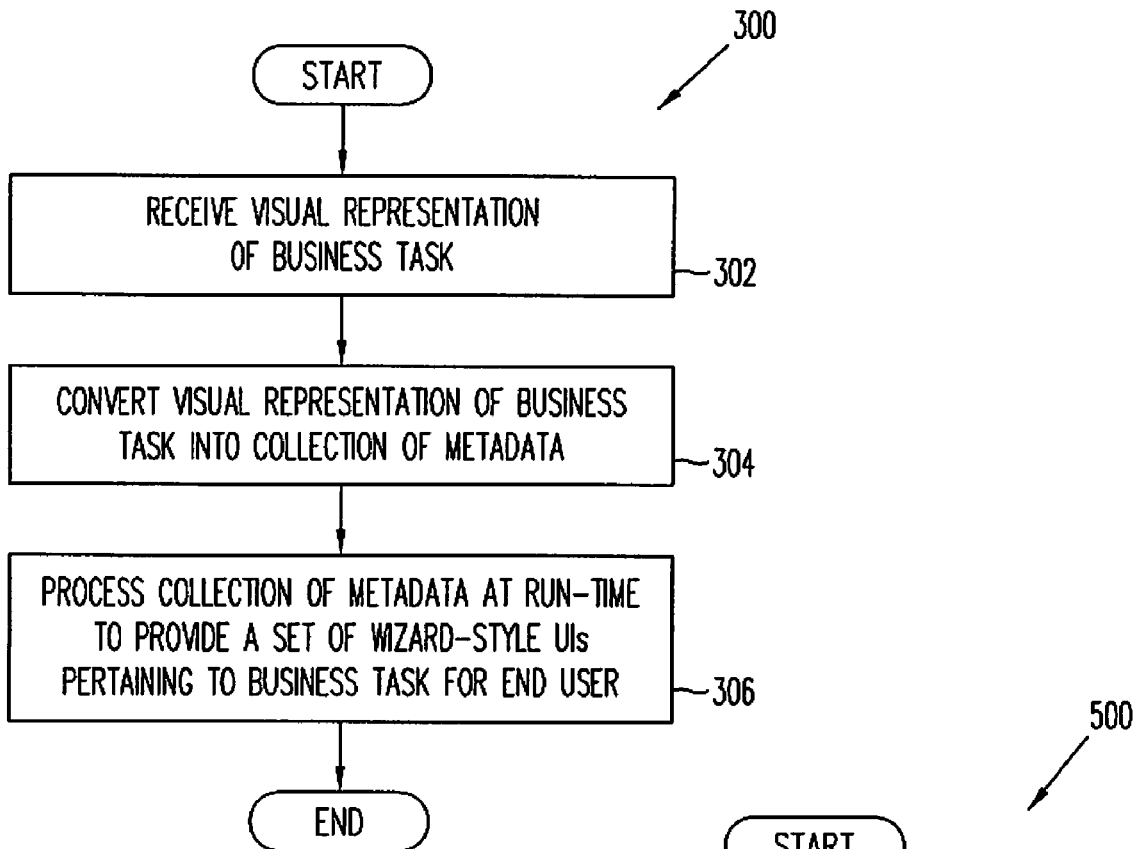
FIG. 3 is a flow diagram of one embodiment of a process for building wizard-style U's pertaining to a business task.

FIG. 3 is a flow diagram of one embodiment of a process 300 for building wizard-style UIs pertaining to a business task. The process may be performed by processing logic that may comprise hardware (e.g., circuitry, dedicated logic, etc.), software (such as run on a general purpose computer system or a dedicated machine), or a combination of both. Processing logic may reside in the system 100 of FIG. 1A.

Referring to FIG. 3, process 300 begins with processing logic receiving a visual representation of a business task (block 302). The visual representation of the business task is created by an intermediate user in a design environment (e.g., a task developer such as a business analyst, a software developer or an end-user). In one embodiment, the design environment allows the intermediate user to create the task visual representation declaratively, without writing any code. In one embodiment, the task visual representation is in the form of a flowchart containing a sequence of steps to be performed for the task. These steps may include, for example, UI view steps, service invocation steps, database operation steps, decision steps, subtask steps, etc.

In one embodiment, the design environment allows the intermediate user to provide properties for the task (e.g., the name of the task, access limitations for the task, etc.) and individual steps of the task (e.g., fields to be entered by an end user for a UI view step, database fields to be updated for a database operation step, branching conditions for a decision step, the name of a service to be called for a service invocation step, input/output arguments for a subtask step, etc.). In one embodiment, one of the task-level properties for non-UI steps is the repeatable property that specifies whether the step should be re-executed upon re-visit during forward navigation. In one embodiment, the design environment also allows the intermediate user to define navigation controls for the task UI views (e.g., Previous, Next, Pause, Cancel, etc.). In addition, the design environment may allow the intermediate user to specify analytics data capture (e.g., task performance parameters during runtime, timestamps, etc.) within a task flow.

At block 304, processing logic converts the visual representation of the task into a collection of metadata (e.g., XML representation of metadata). This metadata defines the steps, the execution flow, the branching logic, UI-related instructions, and other information pertaining to the task. The collection of metadata may also include properties of the task and properties of individual steps of the task.

At runtime, processing logic processes the collection of metadata pertaining to the task to provide a set of task wizard-style UIs for an end user (block 306). In one embodiment, processing logic also provides navigation support to allow the end user to use the navigation controls when navigating through the task U's, as will be discussed in more detail below. In one embodiment, processing logic captures analytics data during the execution of the task.

Figure 4:
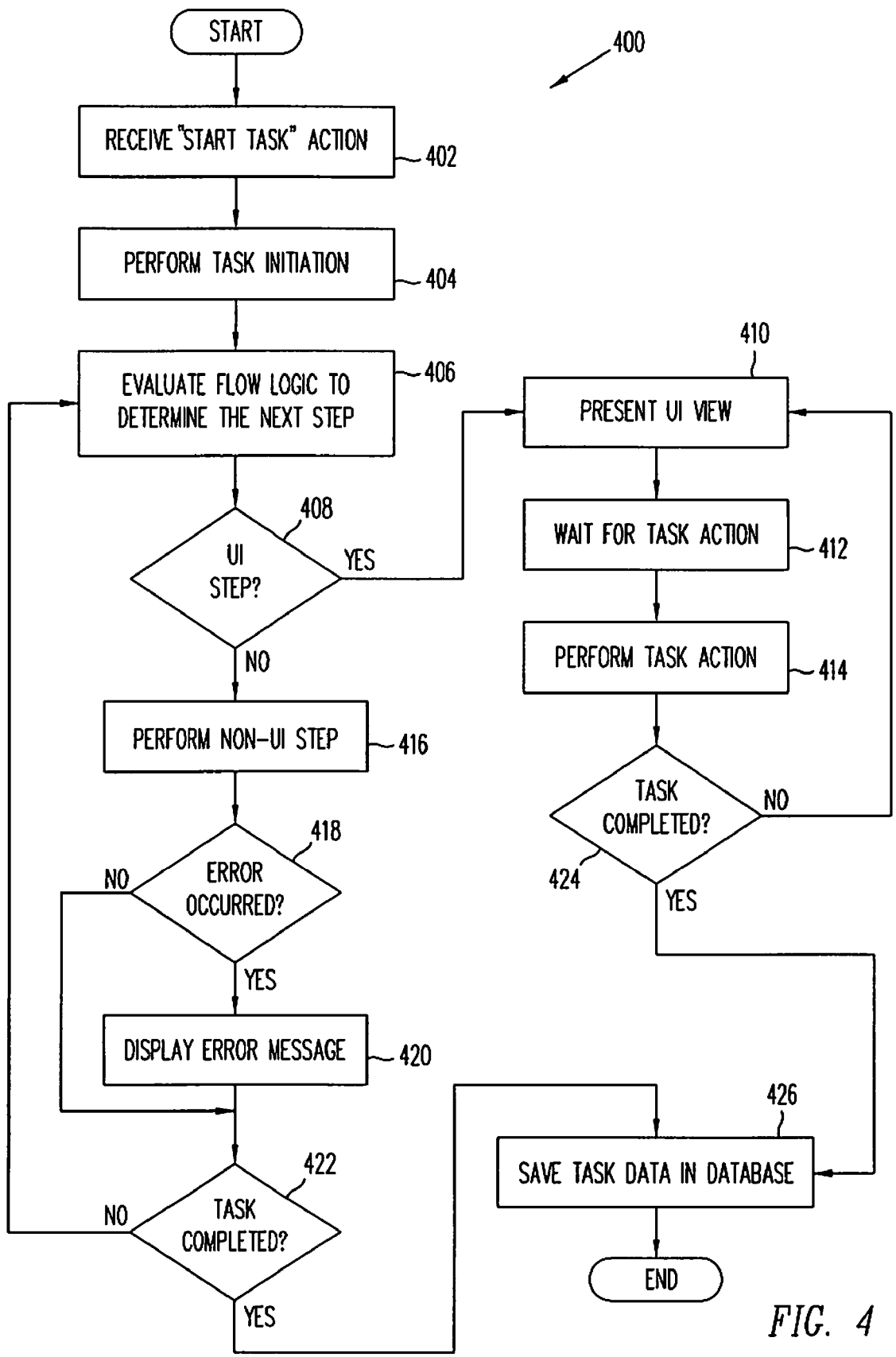
FIG. 4 is a flow diagram of one embodiment of a method for executing a business task associated with wizard-style U's.

FIG. 4 is a flow diagram of one embodiment of a method 400 for executing a business task associated with wizard-style U's. The method may be performed by processing logic that may comprise hardware (e.g., circuitry, dedicated logic, etc.), software (such as run on a general purpose computer system or a dedicated machine), or a combination of both. Processing logic may reside in the runtime engine 200 of FIG. 2.

Referring to FIG. 4, method 400 begins with processing logic receiving the Start Task action (block 402). The Start Task action may be received when an end user selects a new or paused task (e.g., stored in the Inbox). Alternatively, the Start Task action may be run when an end-user starts a new instance of a standalone task.

At block 404, processing logic initiates the task selected by the end user and determines the next UI view. In one embodiment, as part of task initiation, processing logic loads the definition of the task into a task definition cache maintained by the runtime engine 200. The definition of the task contains the collection of metadata discussed above. One embodiment of a task initiation process will be discussed in more detail below in conjunction with FIG. 5.

At block 406, processing logic evaluates, based on the task definition, the flow logic of the task to identify the next step to be performed. This may involve evaluation of all branching conditions if the current step is a decision step.

At block 408, processing logic decides whether the next step is the UI view determined previously (e.g., during task initiation). If not, processing logic performs the non-UI step (block 416) and checks for errors (block 418). If an error occurred, processing logic presents an error message (block 420) and proceeds to block 422. If no error occurred, processing logic proceeds directly to block 422.

At block 422, processing logic determines if the current step is the last step of the task. If not, processing logic returns to block 406. If so, processing logic saves the task data in the database (block 426).

If processing logic decides at block 408 that the next step is the UI step, processing logic presents the UI view to the end user (block 410) and waits for a navigation action (e.g., Next, Previous, Pause or Cancel). Upon receiving a navigation action (e.g., when an end user presses a navigation button) (block 412), processing logic performs the corresponding task navigation operations (block 414), which may include determining the next UI view, and proceeds to block 424, where processing logic checks whether the task has been completed. If the task has been completed, data in task transaction is saved into the database (block 426), otherwise, the next UI view is presented (block 410), and the loop continues until the task is completed.

The navigation operations may allow the end-user to move to prior UI views (e.g., by activating the Previous button) and then retrace the steps (e.g., by activating the Next button). In one embodiment, the end user can optionally modify data entered and change execution basis. In one embodiment, the steps performed in the execution flow can be conditionally re-executed (e.g., if allowed by the settings provided by the intermediate user) when reached multiple times via the previous/next actions. In one embodiment, the UI view state is maintained across the end-user's previous/next actions. The UI view may be reconstituted in the state where it was left.

In one embodiment, processing logic allows for partial record editing. In particular, a record can be in an incomplete/invalid state when the Previous action is used. Then, partially entered data will be displayed to the end user when the view is returned to via a subsequent Next action. In one embodiment, a user can go iteratively through a sequence of views, and processing logic will maintain the history of step instances through each loop.

In one embodiment, processing logic supports alternate paths when re-executing steps. That is, if an end user uses the Previous button to go backward, he or she may change previously entered data values. Then, when the end user uses the Next button to move forward, the data entry changes can cause a different sequence of task steps to be followed. If so, processing logic follows this different sequence of steps.

In one embodiment, processing logic ensures that partially edited records, which have not been validated only show up in the execution branch and UI view that originally created them. If the task is completed, processing logic ensures that records that have not been validated do not get committed to the database.

One embodiment of the navigation process will be discussed in more detail below in conjunction with FIG. 6.

Figure 5:
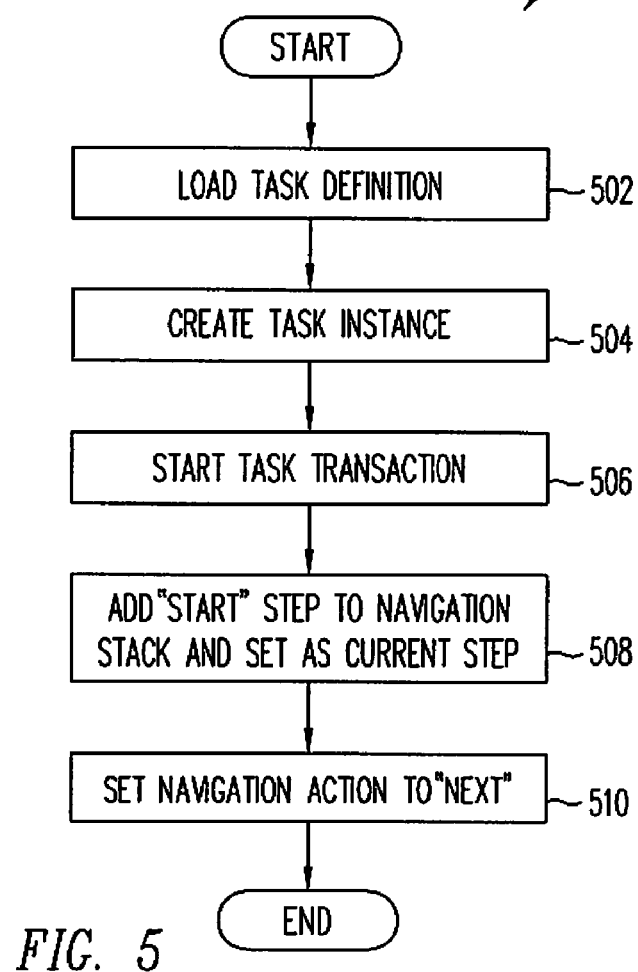
FIG. 5 is a flow diagram of one embodiment of a task initiation process.

FIG. 5 is a flow diagram of one embodiment of a task initiation method 500. The method may be performed by processing logic that may comprise hardware (e.g., circuitry, dedicated logic, etc.), software (such as run on a general purpose computer system or a dedicated machine), or a combination of both. Processing logic may reside in a task controller 204 of FIG. 2.

Referring to FIG. 5, method 500 begins with processing logic loading a definition of the task (block 502). In one embodiment, processing logic loads the task definition containing a relevant collection of metadata into a task definition cache.

At block 504, processing logic creates a task instance.

At block 506, processing logic starts the task transaction. In one embodiment, processing logic invokes the object manager to start the task transaction.

At block 508, processing logic adds the Start step instance to the navigation stack and sets the current step to the Start step.

At block 510, processing logic sets the navigation action to Next.

Figure 6:
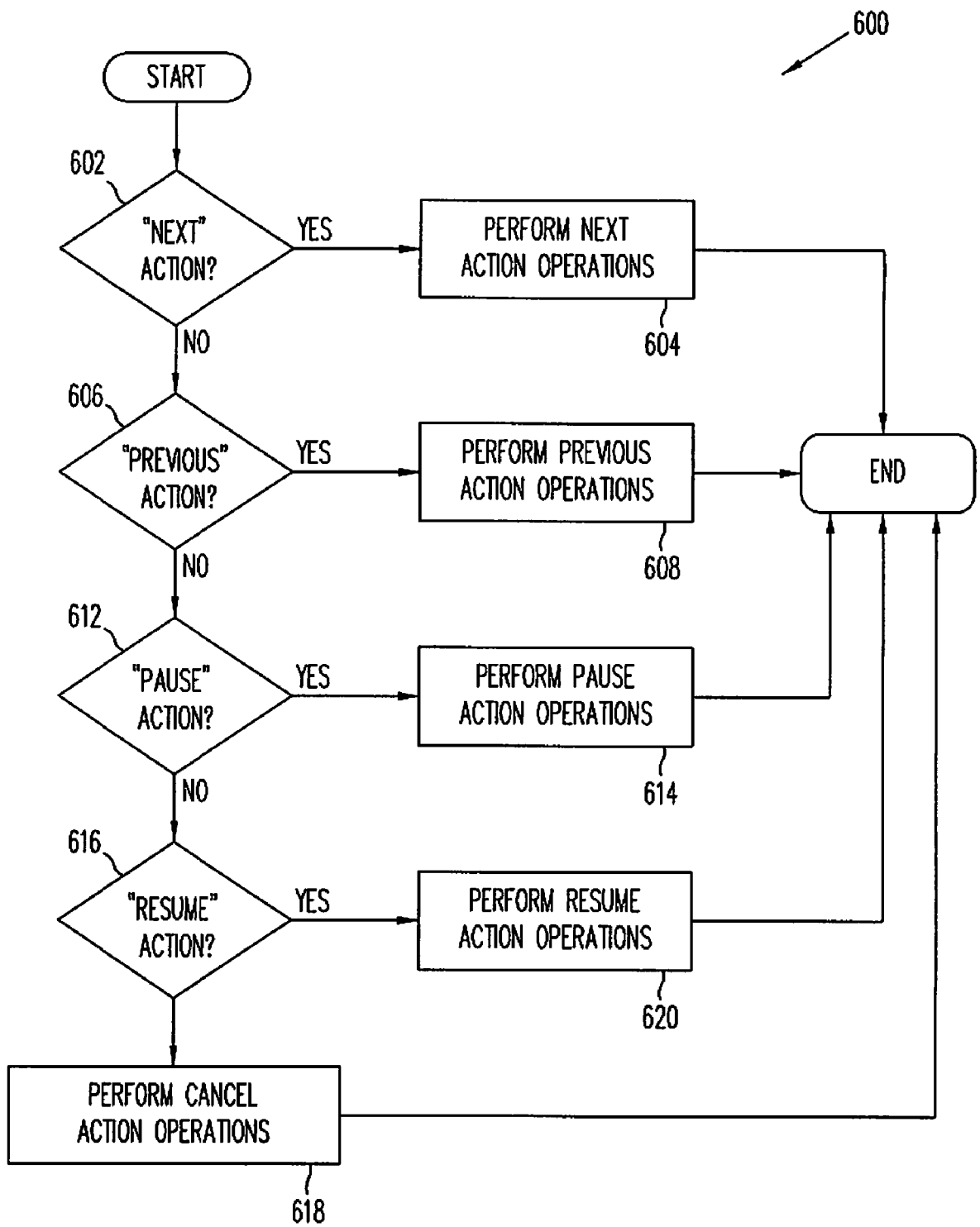
FIG. 6 is a flow diagram of one embodiment of a navigation method.

FIG. 6 is a flow diagram of one embodiment of a navigation method 600. The method may be performed by processing logic that may comprise hardware (e.g., circuitry, dedicated logic, etc.), software (such as run on a general purpose computer system or a dedicated machine), or a combination of both. Processing logic may reside in a task controller 204 of FIG. 2.

Referring to FIG. 6, method 600 begins with processing logic determining whether the current navigation action is the Next action (block 602). If so, processing logic performs the Next action operations (block 604). One embodiment of a process for performing the Next action operations will be discussed in more detail below in conjunction with FIG. 7.

If the current navigation action is the Previous action (block 606), processing logic performs the Previous action operations (block 608). One embodiment of a process for performing the Previous action operations will be discussed in more detail below in conjunction with FIG. 8.

If the current navigation action is the Pause action (block 612), processing logic performs the Pause action operations (block 614).

If the current navigation action is the Resume action (block 616), processing logic performs the Resume action operations (block 620).

If the current navigation action is none of the above, then processing logic decides that it is the Cancel action and performs the Cancel action operations (block 618).

The navigation operations utilize a history stack referred to as the Navigation stack. In particular, when a task step is first completed, the step instance information is stored in a frame of the Navigation stack. If the current task step is a view step, a snapshot of the current UI state is recorded in a frame of the Navigation stack. The task controller uses the Navigation stack to navigate between previously completed steps, and to restore UI states for the task views during backward navigation.

Figure 7A:
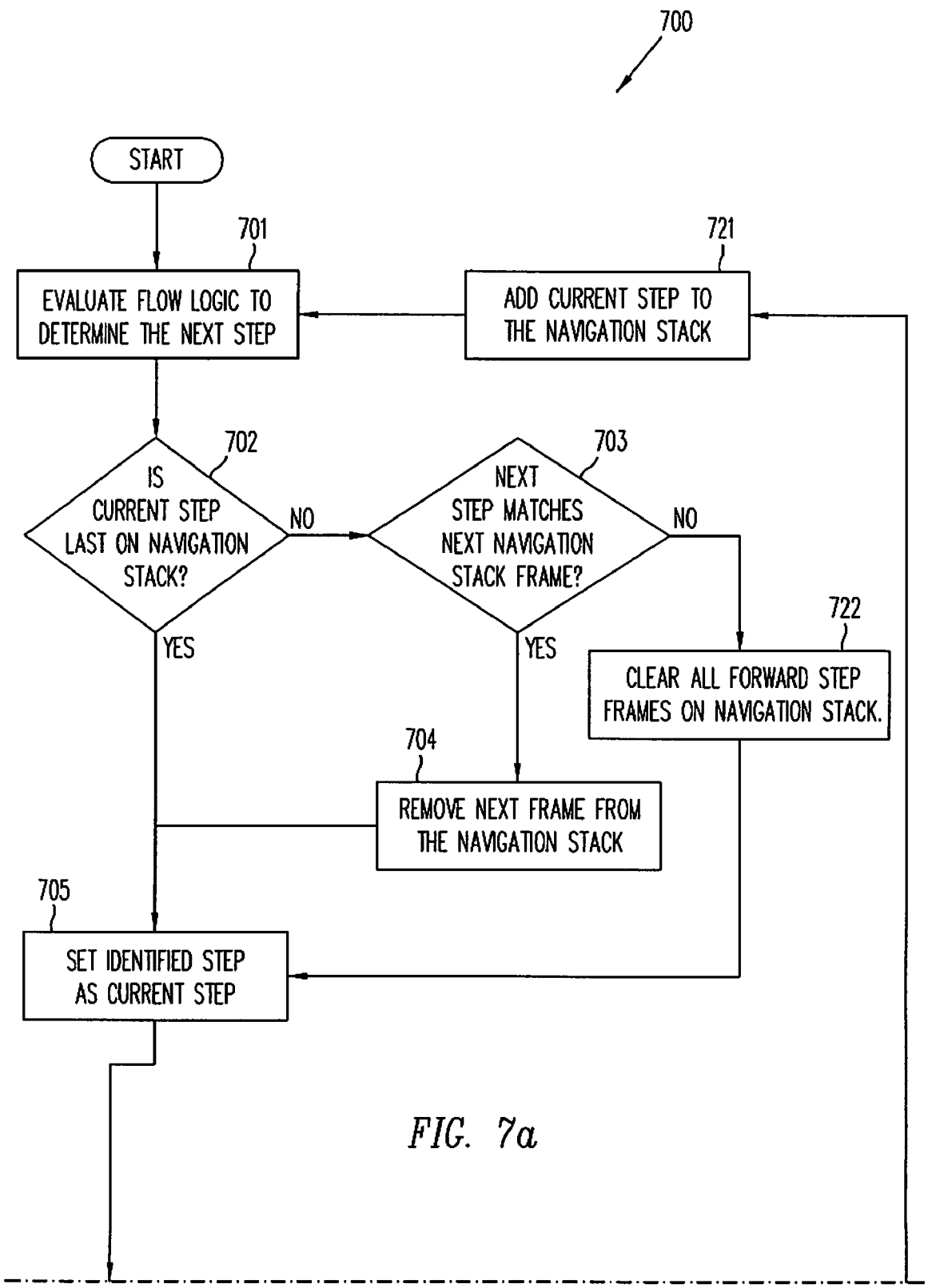
FIG. 7 is a flow diagram of one embodiment of a method for performing Next action operations.
Figure 7B:
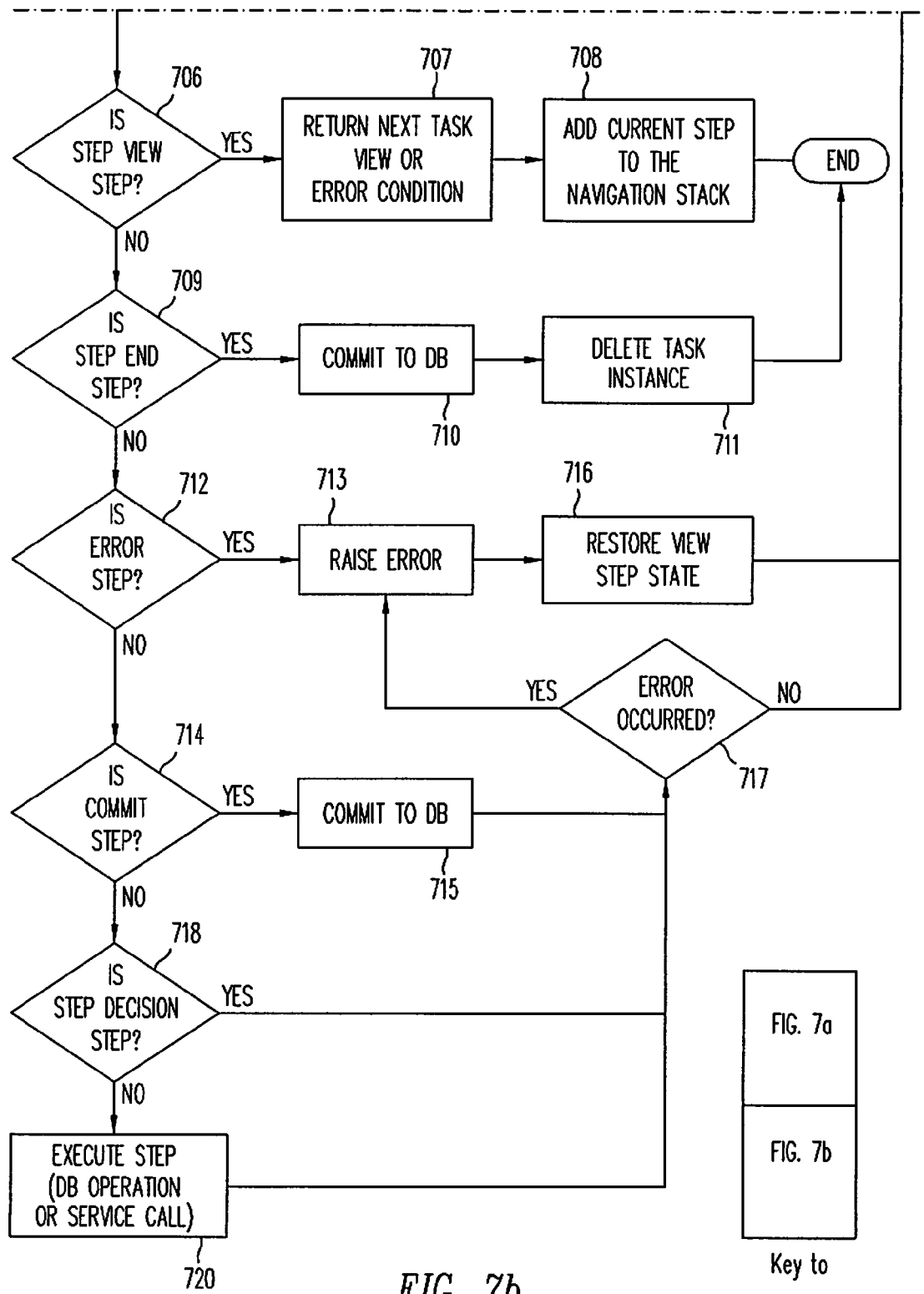

FIG. 7 is a flow diagram of one embodiment of a method 700 for performing Next action operations. The method may be performed by processing logic that may comprise hardware (e.g., circuitry, dedicated logic, etc.), software (such as run on a general purpose computer system or a dedicated machine), or a combination of both. Processing logic may reside in a task controller 204 of FIG. 2.

Referring to FIG. 7, method 700 begins when a signal for a next action is received. Processing logic starts with evaluating the flow logic to determine the next step (block 701). This may includes evaluation of all branching conditions if the current step is a decision step. This functionality is similar to that performed by block 406 in FIG. 4.

Once the next step has been identified, processing logic checks the navigation stack to see if the current step is the last step on the navigation stack (block 702). If false, the processing logic checks if the identified step is the same as the next step on the navigation stack (block 703). If this is also false, it means that the task execution sequence has been altered. As a result, the forward step history on the navigation step becomes invalid, and needs to be erased (block 722). Processing logic continues by setting the identified step as the current step (block 705). If the identified step is a task view step (block 706), processing logic returns it as the next task view (block 707), and adds the identified step to the navigation stack (block 708).

If the identified step is an end step (block 709), processing logic commits task data from temporary storage to the database (block 710) and deletes the current task instance (block 711).

If the identified step is an error step (block 712), processing logic raises the user-defined error (block 713), and restores the state to the last shown view (block 716).

If the identified step is a commit step (block 714), processing logic commits task data from temporary storage to the database (block 715). If successful, the commit step is added to the navigation stack (block 721).

If the identified step is a decision step (block 718), processing logic proceeds to add the decision step to the navigation stack (block 721). The branching logic is then evaluated in block 701.

If the type of the identified step is none of the above, it is either a database operation step or a service invocation step. In either case, processing logic executes the identified step (block 720) and, if successful, the executed step is added to the navigation stack (block 721). After that, processing logic returns to block 701, at which point the above sequence is repeated until the view or end step is reached.

Figure 8:
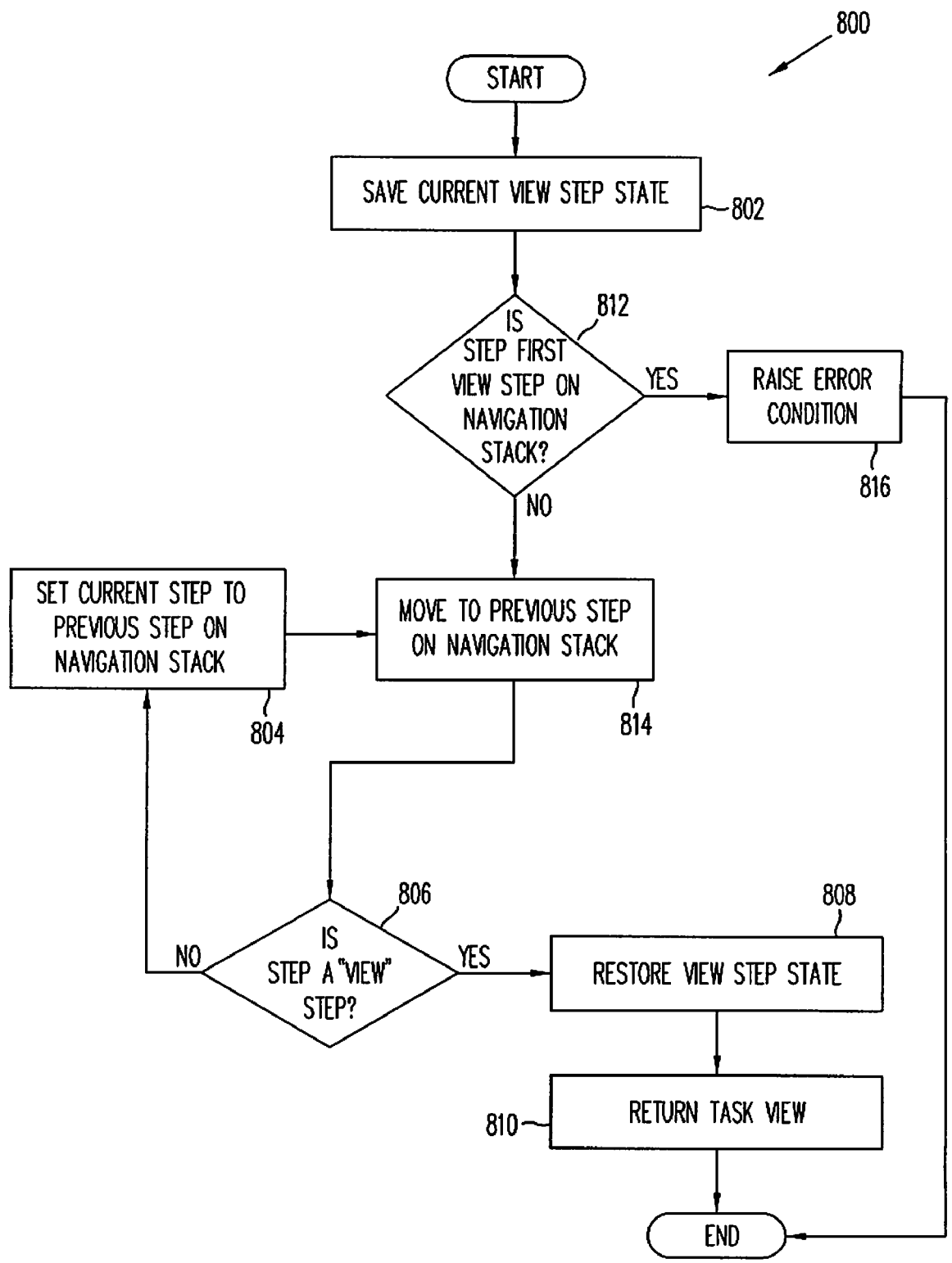
FIG. 8 is a flow diagram of one embodiment of a method for performing Previous action operations.

FIG. 8 is a flow diagram of one embodiment of a method 800 for performing Previous action operations. The method may be performed by processing logic that may comprise hardware (e.g., circuitry, dedicated logic, etc.), software (such as run on a general purpose computer system or a dedicated machine), or a combination of both. Processing logic may reside in a task controller 204 of FIG. 2.

Referring to FIG. 8, method 800 begins with processing logic saving the state of the current view step on the Navigation stack (block 802).

Next, processing logic sets the current step to the previous step from the Navigation step (block 804) and determines whether this task step is a view step (block 806). If so, processing logic restores the state of this view step (block 808) and returns this task view (block 810). If no, processing logic determines whether this view step is the first step on the navigation stack (block 812).

If this view step is the first view step on the navigation stack, processing logic returns an error (block 816). Otherwise, processing logic moves to the previous view step on the Navigation stack (block 814), restores its state (block 808), and returns its name as the name of the view to be presented to the end user (block 810).

Embodiments of a subtask mechanism will now be discussed in more detail. Subtasks, like subprograms, enable task programmers to break down a large task flow design into reusable modules. Subtasks should not affect the UI behavior seen by the end user. In addition, the bi-direction navigation behavior of a task application should not be altered when a task flow is partitioned into a parent task and a subtask, and the effect of navigating into and out of a subtask should be completely transparent to the end user. In particular, a previous operation should allow an end user to back out of a partially completed subtask or return back into a subtask that has been executed already. In addition, a combination of a previous and next operation should allow an end user to re-enter into the same invocation of a subtask. Further, a previous operation should allow an end user to traverse through subtasks used in a loop that have multiple invocations. Traditional subroutine call models do not support this type of run time behavior. As to macro expansion models, they may provide support for the bi-direction navigation behavior, but they lack function call invocation semantics.

The above requirements also cause difficulties for traditional subroutine call models in such areas as argument passing and local variables. The iteration requirement is also a problem for macro expansion models because each loop iteration requires a separate set of local variables for the subtask. Traditional programming models use a call stack to support return arguments and nested subtask invocations. However, a call stack does not support backward navigation from a subtask that has already returned, or backward navigation through several invocations made in a loop.

Embodiments of the present invention address the above problems using a subtask mechanism that includes a combination of stack frames and a logic call stack created within a navigation history stack. This mechanism has run-time behavior of macro expansion while allowing an intermediate user to use it as if having function call invocation semantics.

Figure 9:
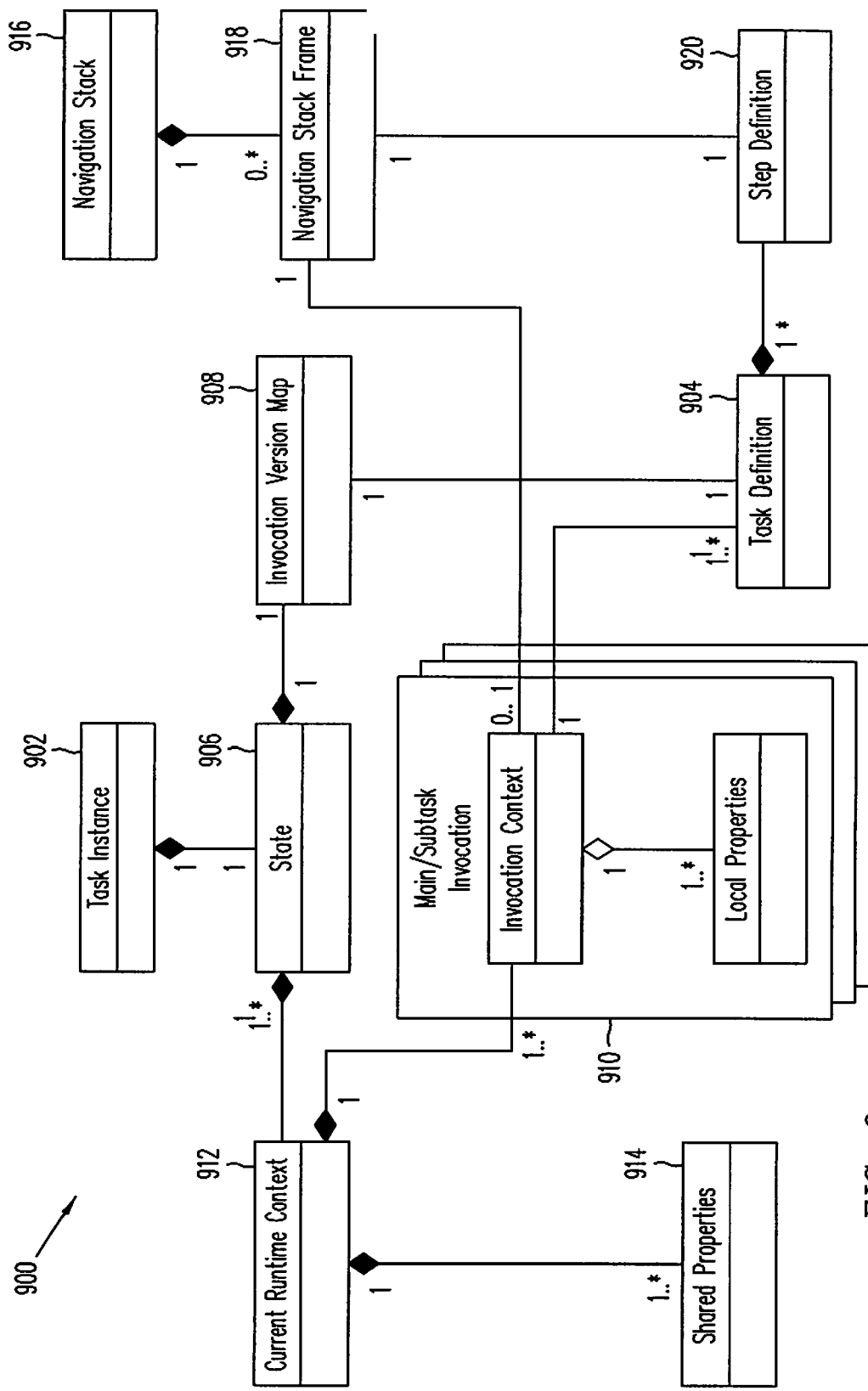
FIG. 9 illustrates task controller components involved in handling subtasks, in accordance with one embodiment of the present invention.

FIG. 9 illustrates task controller components involved in handling subtasks, in accordance with one embodiment of the present invention.

Referring to FIG. 9, when a task is initiated, a task instance 902 is created. The task instance 902 may have a state object 906 which contains an invocation version map 908 persisted as part of the task state 906. Each entry in the version map 908 refers to a version of a task/subtask definition 904. When the task instance 902 is first created, invocation context 910 for the main task may be created and designated as the current runtime context 912. The current runtime context 912 structure also has a reference to a list of shared properties 914. Shared properties are global process variables that are accessible by the main task and the subtasks. Task instance ID, task object ID, error code are examples of shared properties.

Each invocation context 910 stores runtime information local to current main task or subtask invocation. Local runtime information may include a context ID, a task definition ID, a current step 1D and a parent context ID. The current step 1D serves as the return program counter for the current subtask, when its child subtask has finished execution and returned control to the parent. The parent context ID is used for switching back to the subtask's parent context when the current subtask has completed. The invocation context 910 may also include a list of non-repeatable steps already executed in this invocation. Each invocation context 910 includes a list of local properties. Local properties are user-defined process variables accessible only to the subtask while is it being invoked. When a subtask step is used in a loop, a new invocation context and a list of local properties may be created and associated with every subtask invocation. Invocation contexts may not be shared but may be reused across multiple invocations. The invocation contexts 910 are chained to their parent contexts through the parent context IDs forming a logical call stack.

A navigation stack 916 keeps navigation history for the task instance 902. In particular, the navigation stack 916 includes references to navigation stack frames 918. The navigation stack frames 918 correspond to relevant step definitions 920 and represent task steps the end user has traversed. Each navigation stack frame 918 may store an identifier of a relevant task step and a reference to invocation context 910 of the relevant task step. In one embodiment, the navigation stack 916 includes a forward navigation stack and a backward navigation stack. The top of the backward stack points to the task step the end user is currently on.

The navigation stack 916 allows the end user to navigate in and out of a subtask, maintaining proper context such as local variable state during backward navigation.

In one embodiment, a new invocation context 910 is created and appointed the current context 912 every time a subtask is invoked in the forward direction. When the end user navigates backward into a subtask, the controller uses the subtask context as the current context 912. When the end user navigates backward out of a subtask, the controller switches back to the parent context. If the end user navigates backward and then forward into the same subtask retracing the same steps, the subtask's initial invocation context may be reused. If the end user navigates forward taking a different path, the original subtask's invocation context is freed. If the same subtask step is invoked again through a different path, a new invocation context is created for the subtask.

In one embodiment, the navigation stack 916 also tracks changes in branching decisions when Previous and Next are used in combination. If a branching decision changes the original path taken through the flow, subsequent subtask invocations may be treated as new calls, and local variables may be set to initial values. The original forward path may then be invalidated, and the frames on the forward stack may be discarded.

In one embodiment, local variables are initialized only during initial invocation, and prior values are maintained when re-entering a subtask invocation. Subtask local variables can have initial values, with initial value assignment done at the original subtask invocation. Local variable values can be maintained if an invoked subtask is exited via Previous and then re-entered via Next. In one embodiment, explicit assignment is used to change the above behavior when necessary.

In one embodiment, local variables maintain values from the subtask return time to provide consistent behavior when Previous is used to navigate back into a subtask that has already returned. In addition, in one embodiment, simple arguments are passed by value and follow re-execution semantics of assignment statements to create consistent semantics when Previous/Next is used to re-enter a subtask invocation multiple times.

In one embodiment, the parent task can assign values to the input arguments of a subtask step. When the subtask is invoked, the local variables of the subtask may be initialized with the values of the input arguments. When the subtask returns, the parent task can read the subtask's local variables through the output arguments of a subtask step. Because parent tasks and subtasks have separate local properties, argument passing causes the data to be copied between the parent tasks and subtasks. However, for hierarchical or structured local variables, copying data could be expensive. To avoid this, hierarchical data type can be passed by reference between parent tasks and subtasks.

In one embodiment, subtasks are deployed independently from their parent tasks. Each deployed version of a subtask has its own deployment ID. Once a subtask is executed, its deployment ID is stored in the parent task instance's invocation context, which will be persisted when the parent task instance is paused.

In one embodiment, when a task instance is resumed, it invokes the same version of subtask definition used before it was paused. A version map is used for associating the deployment IDs of the subtask invocations. The invocation version map is persisted as part of the instance's state and loaded when the instance resumes.

In one embodiment, the controller uses the deployment IDs and timestamps for task definition version association. An invocation timestamp is recorded when the instance is started. A subtask's deployment ID is recorded when it is invoked first time by the task instance. If a subtask definition has not been invoked before by the task instance, the latest version activated before the task instance's invocation timestamp may be chosen. If a subtask definition has already been invoked before, the deployment ID in the version map may be used instead.

In one embodiment, exception branches are allowed within a subtask but not for going in and out of a subtask step. This ensures that a subtask can only be exited from its end step when there is no error occurs during forward direction, and this behavior is consistent with the exit model of a main task. If there were any errors during forward navigation, and the last valid task view was in the parent task, then the default handler may perform an implicit 'navigate previous' which switches the instance back to the parent task context in order to restore the instance to a consistent state.

Figure 10:
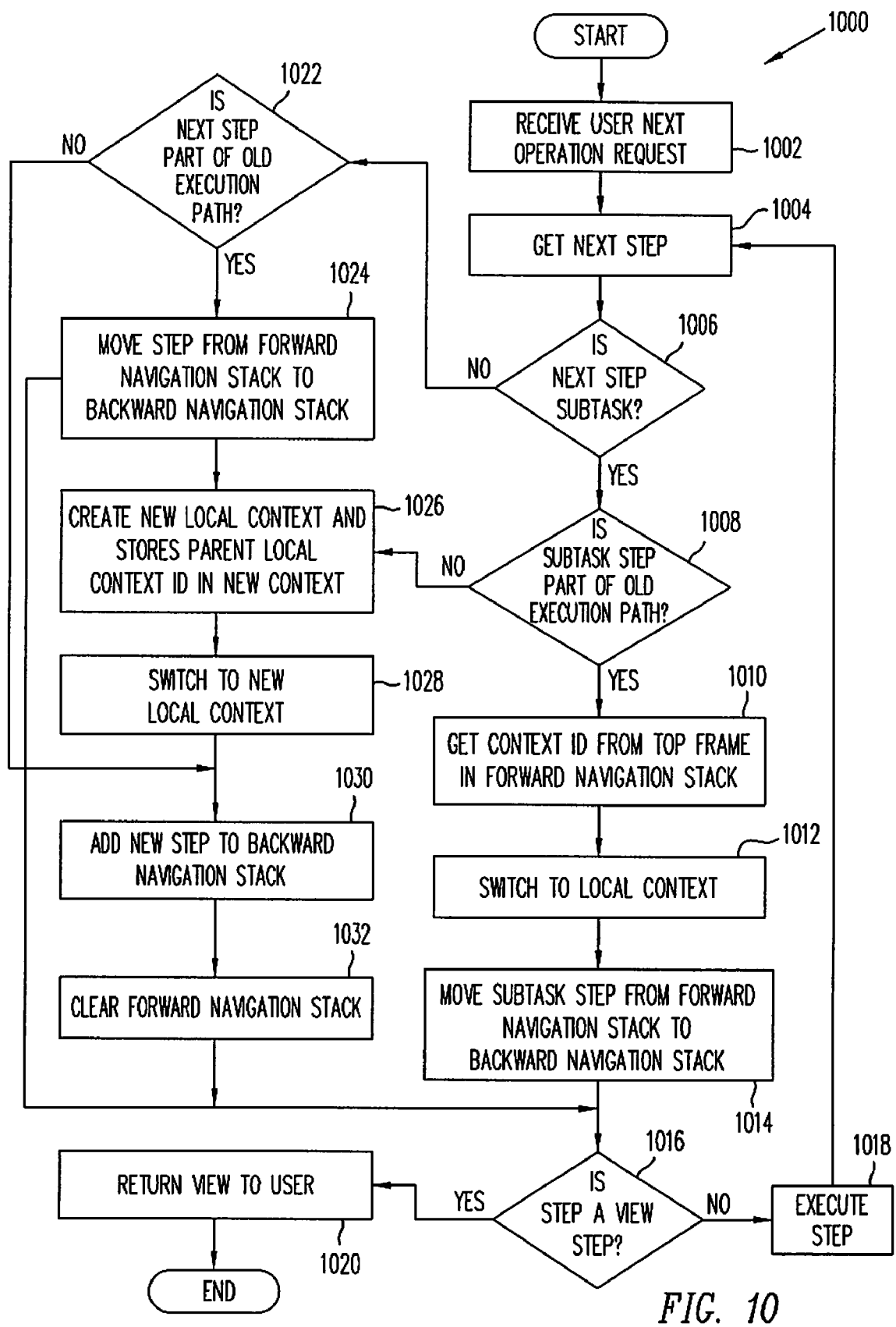
FIG. 10 is a flow diagram of one embodiment of a forward navigation method for entering a subtask.

FIG. 10 is a flow diagram of one embodiment of a method 1000 for entering a subtask on forward navigation. The method may be performed by processing logic that may comprise hardware (e.g., circuitry, dedicated logic, etc.), software (such as run on a general purpose computer system or a dedicated machine), or a combination of both. Processing logic may reside in a task controller 204 of FIG. 2.

Referring to FIG. 10, method 1000 begins with processing logic receiving a user next operation request (block 1002). In response, processing logic evaluates flow logic to determine the next step (block 1004). If the next step is a subtask step (block 1006), processing logic determines whether the subtask step is part of an old execution path (block 1008). In one embodiment, processing logic makes this determination by examining the forward navigation stack. If processing logic finds that the subtask step is on top of the forward navigation stack, then the user is retracing an old execution path. Otherwise, the user is following a new or changed path.

If the subtask step is part of an old execution path, processing logic obtains the subtask's local context ID from the subtask step on the top of the forward navigation stack (block 1010), switches to the subtask's local context (block 1012), and moves the subtask step from the forward navigation stack to the backward navigation stack (block 1014). Next, if the subtask has a view step (block 1016), processing logic returns the view to the user (block 1016). If not, processing logic executes the task step (block 1018) and returns to block 1004.

If the subtask step is not part of an old execution path (i.e., it is part of a new or changed execution path), processing logic creates a new local context for the subtask (block 1026), stores the parent task's local context ID in the new local context, switches to the new local context (block 1028), and adds the subtask step and its local context ID to the backward navigation stack (block 1030). Next, processing logic clears the forward navigation stack (block 1032) and proceeds to block 1016.

If the next step is a non-subtask step (block 1006), processing logic determines whether this step is part of an old execution path (block 1022). If not, processing logic proceeds to block 1030. If so, processing logic moves this step from the forward navigation stack to the backward navigation stack (block 1024) and proceeds to block 1016.

Figure 11A:
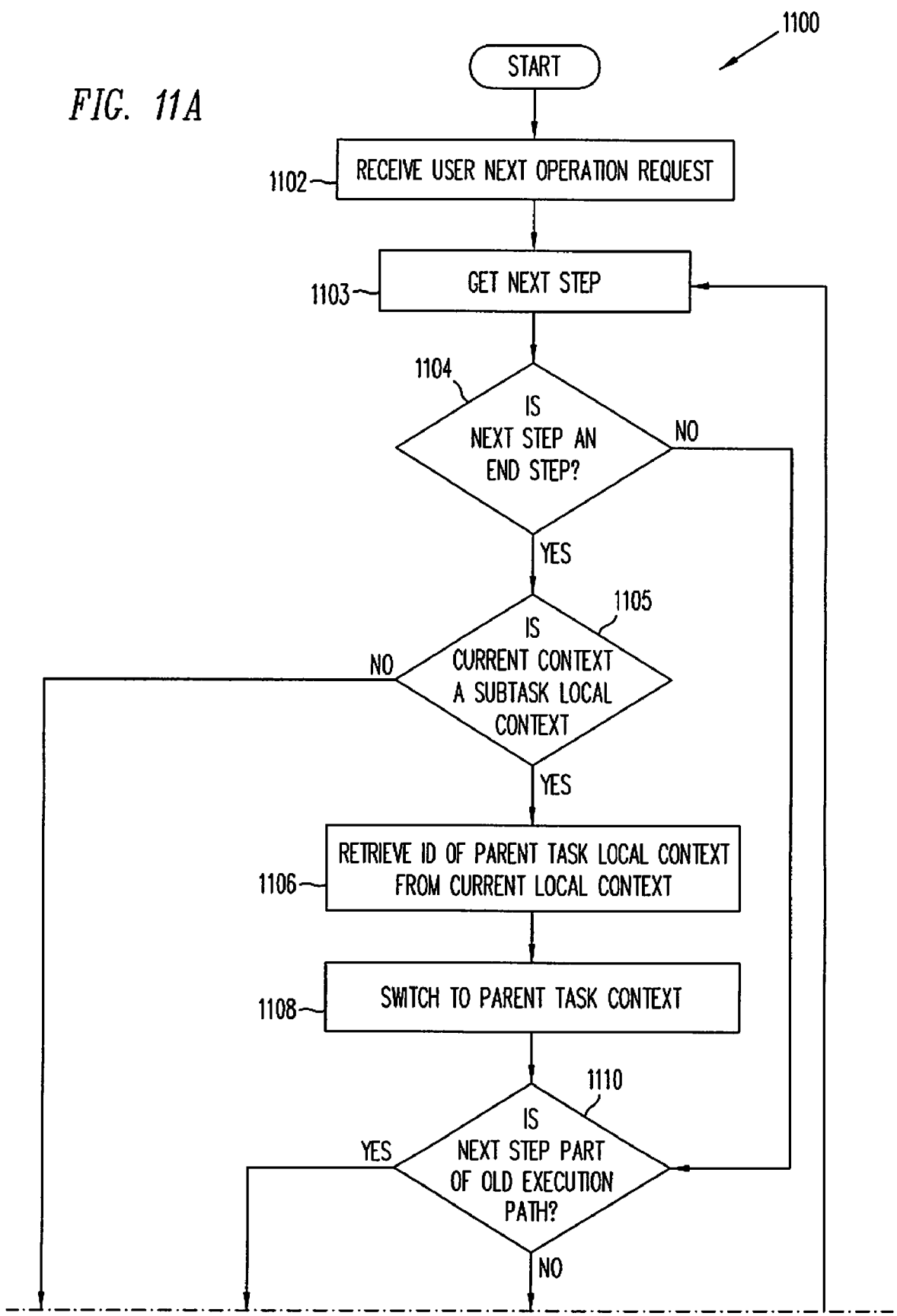
FIG. 11 is a flow diagram of one embodiment of a forward navigation method for exiting a subtask.
Figure 11B:
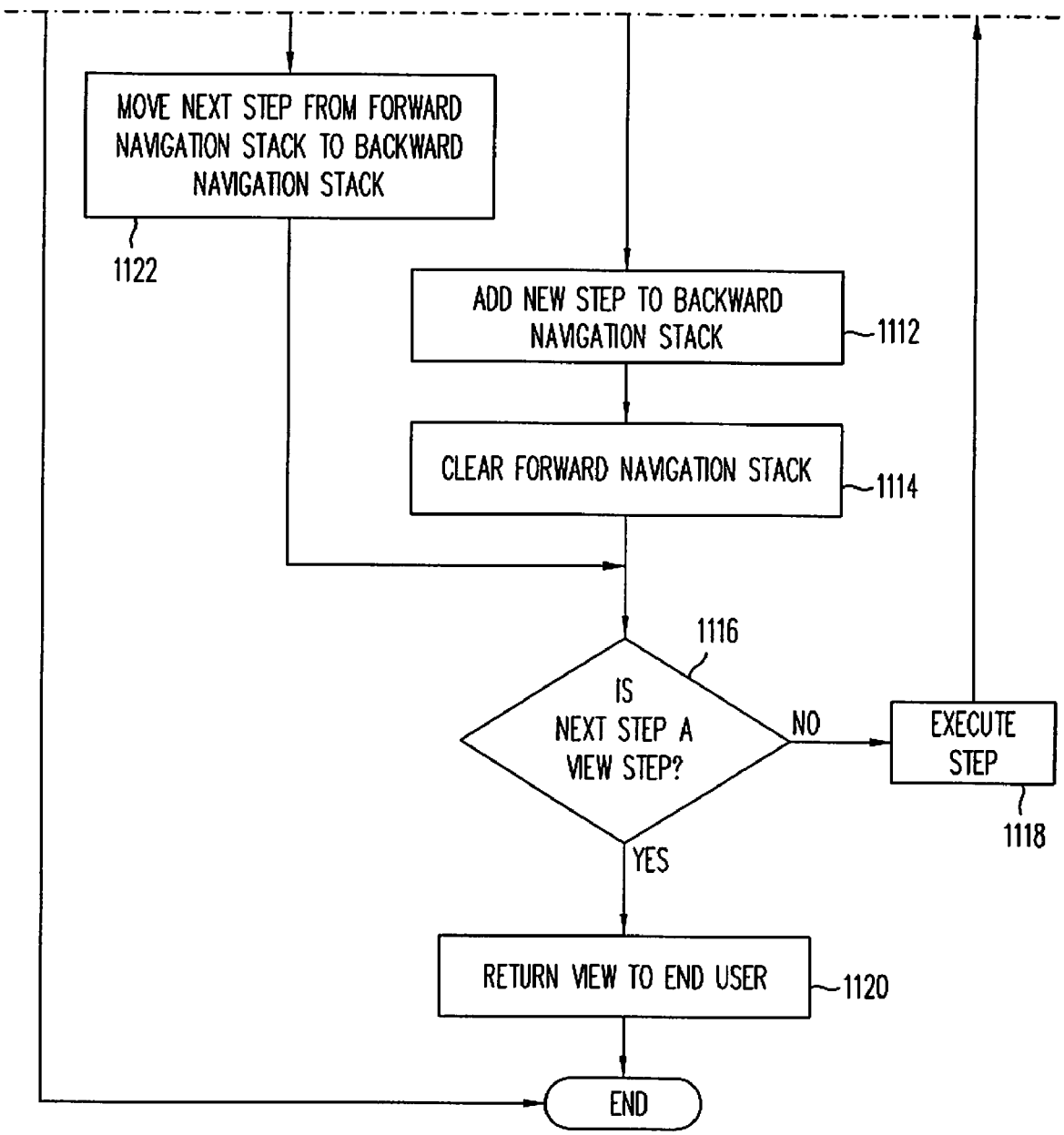

FIG. 11 is a flow diagram of one embodiment of a method 1100 for exiting a subtask on forward navigation. The method may be performed by processing logic that may comprise hardware (e.g., circuitry, dedicated logic, etc.), software (such as run on a general purpose computer system or a dedicated machine), or a combination of both. Processing logic may reside in a task controller 204 of FIG. 2.

Referring to FIG. 11, method 1100 begins with processing logic receiving a user next operation request (block 1102). In response, processing logic evaluates flow logic to determine the next step (block 1103). If the next step is an end step (block 1104), processing logic continues to determine whether the current local context is a subtask context (block 1105). If both conditions are true, processing logic derives that it is about to exit a subtask and re-enter the parent task.

To distinguish a subtask context from a main task context, a subtask local context is always assigned a non-zero context ID, while the main task local context ID is always 0.

Next, processing logic retrieves the local context ID of the parent task from the current local context (block 1106) and switches to the local context of the parent task (block 1108).

At block 1110, processing logic determines whether the step is part of an old execution path. If so, processing logic moves this step from the forward navigation stack to the backward navigation stack (block 1014) and proceeds to block 1116. If not, processing logic adds this step and its local context ID to the backward navigation stack (block 1112) and clears the forward navigation stack (block 1114).

At block 1116, processing logic determines whether the step is a view step. If so, processing logic returns the view to the user (block 1120). If not, processing logic executes the step (block 1118).

Figure 12:
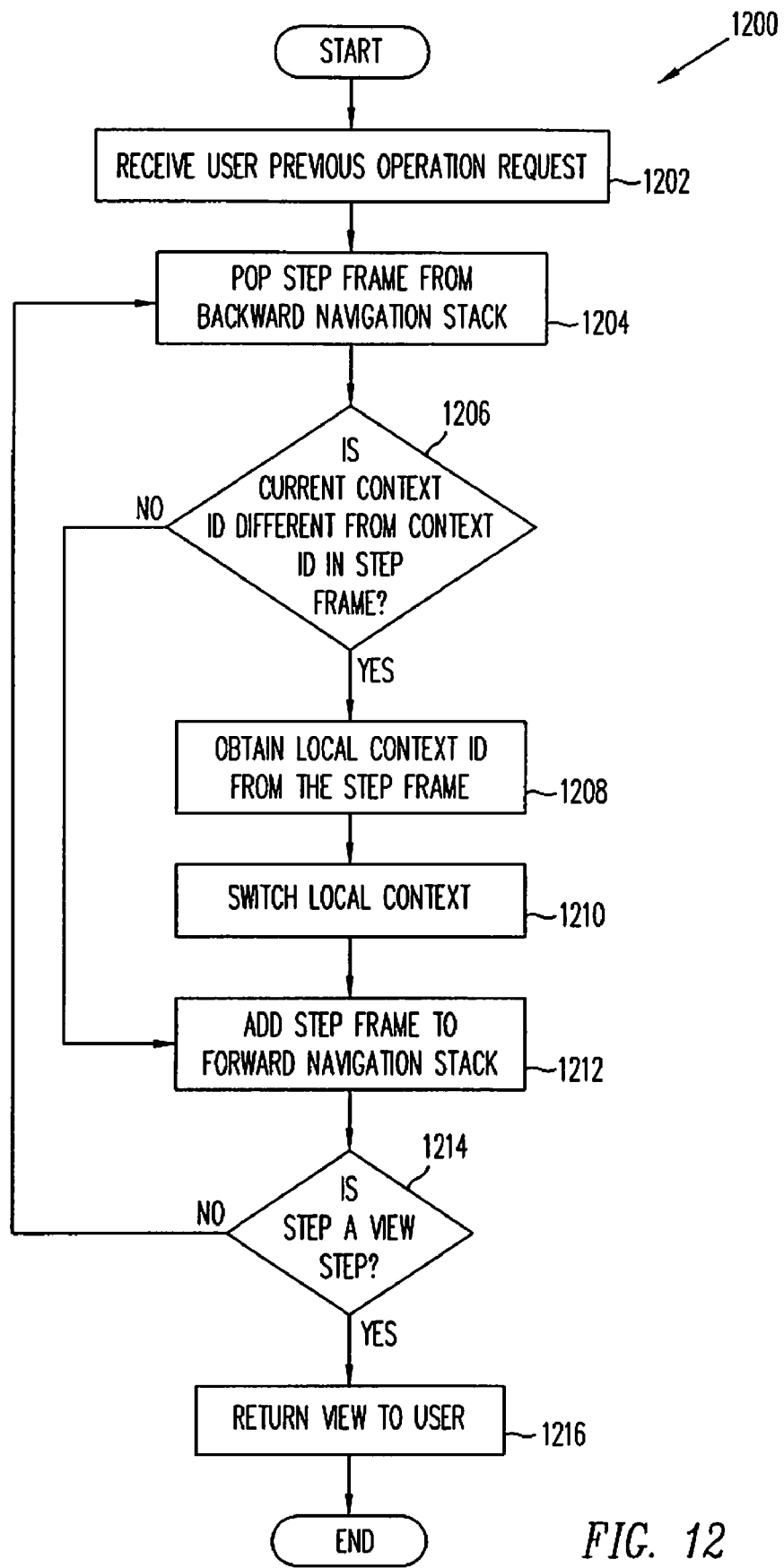
FIG. 12 is a flow diagram of one embodiment of a backward navigation method for entering and exiting a subtask.

FIG. 12 is a flow diagram of one embodiment of a method 1200 for entering and exiting a subtask on backward navigation. The method may be performed by processing logic that may comprise hardware (e.g., circuitry, dedicated logic, etc.), software (such as run on a general purpose computer system or a dedicated machine), or a combination of both. Processing logic may reside in a task controller 204 of FIG. 2.

Referring to FIG. 12, method 1200 begins with processing logic receiving a user previous operation request (block 1202). In response, processing logic pops the step frame from the backward navigation stack (block 1204) and compares the local context ID in the step frame and the current local context ID (block 1206). If the IDs are the same, it means that the task can continue to use the same local context, and processing logic proceeds to block 1212. If the IDs are different, it means that the task is either entering or exiting a subtask at this step frame, and will require switching its current local context (block 1210).

Next, processing logic adds the step to the forward navigation stack (block 1212) and determines whether the step is a view step (block 1214). If so, processing logic returns the view to the user (block 1216). If not, processing logic returns to block 1204 and processes the next step frame on the backward navigation stack repeating the operations.

Figure 13:
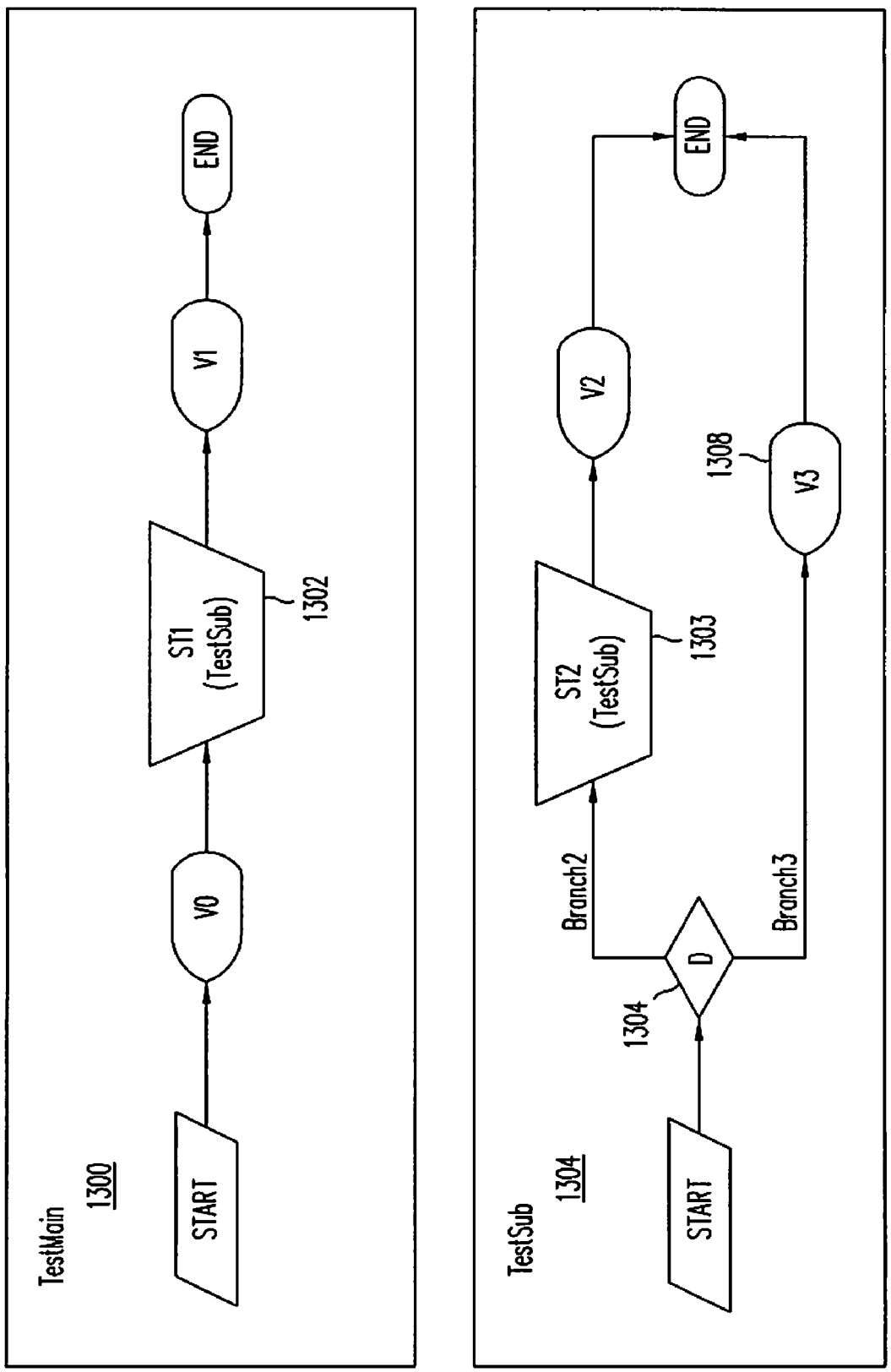
FIGS. 13 and 14 illustrate an exemplary navigation scenario, according to one embodiment of the present invention.
Figure 14:
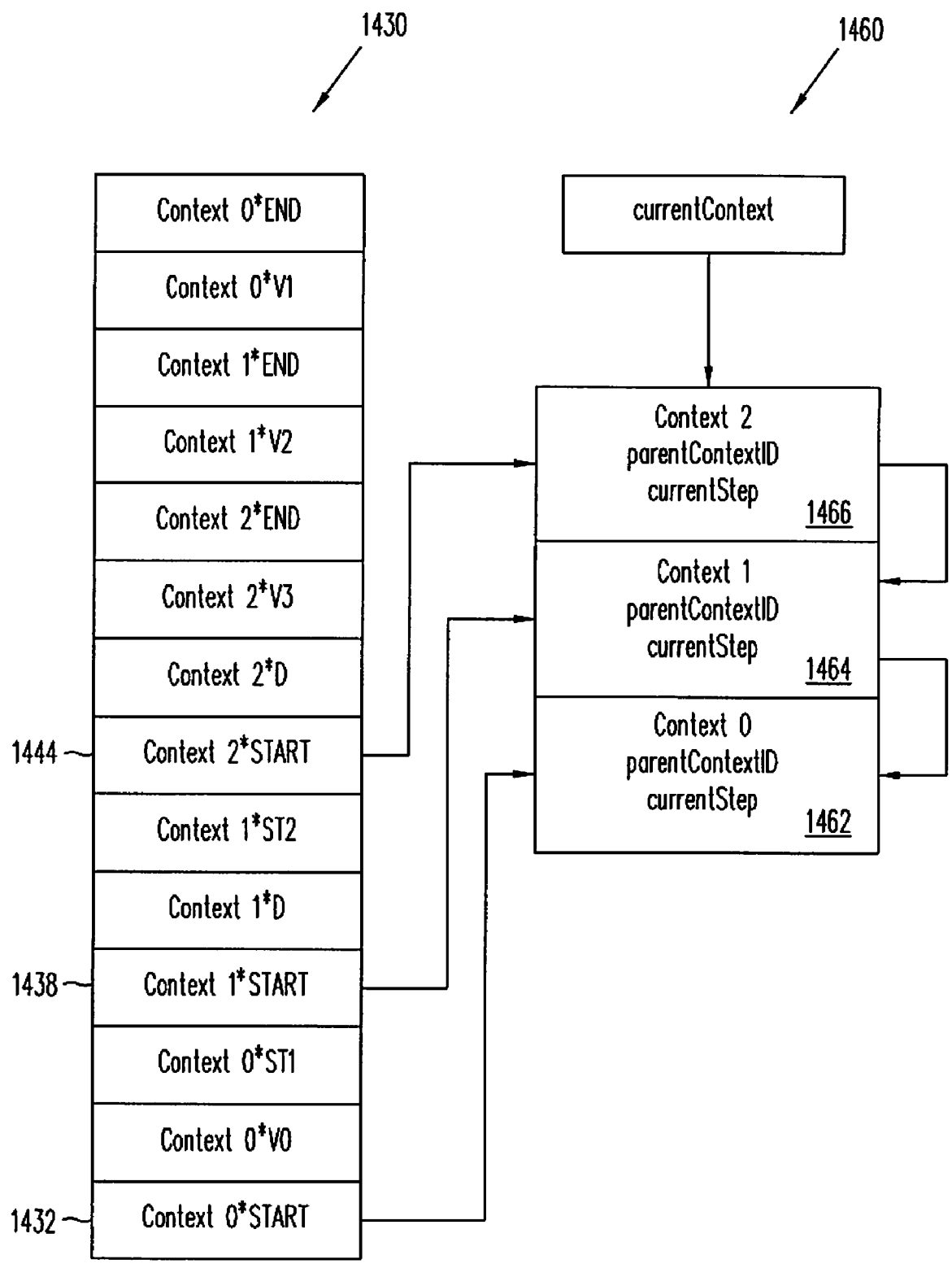

FIGS. 13 and 14 illustrate an exemplary navigation scenario, according to one embodiment of the present invention.

Referring to FIG. 13, flow 1300 of a main task includes a subtask 1302, which calls itself recursively. Subtask flow 1304 shows recursive execution of subtask step 1303 when the subtask follows Branch 2.

According to an exemplary navigation scenario, the main task reaches the subtask step ST1 1402 and start invoking the subtask. The first level invocation 1304 takes Branch2 and invokes itself again at subtask step ST2 1303. The first level invocation would then be suspended at ST2 1303, and the controller starts invoking the second level subtask. The second level invocation takes Branch3, displays view V3 1308, and runs to completion. Then, the controller resumes the first level invocation from it was suspended (step 1303), at which the output argument of the subtask step ST2 1303 is being evaluated in the context of the first level subtask. Thereafter, the first level invocation continues and displays task view V2, and runs to completion. At this point, the controller resumes the main task from where it was suspended, at which the output argument of the subtask step ST1 is being evaluated in the context of the main task. The main task then continues and displays task view V1, and runs to completion.

FIG. 14 illustrates contents of a navigation stack 1430 and invocation contexts 1460 at the time the main task ends. In particular, when the main task is started, it is assigned context ID of 0. The start step is stored in the navigation frame 1432, with its context ID that refers to invocation context 1462.

When the main task arrives at subtask step ST1 and invokes subtask TestSub (frame 1438), invocation context 1464 with ID 1 is created and assigned to the first level subtask. The current step 1D of ST1 is stored in context 1464.

The controller then switches into context 1464 and runs TestSub. The first level subtask takes Branch 2, arrives at step ST2 and invokes subtask TestSub (frame 1444). Invocation context 1466 with ID 2 is created and assigned to the second level subtask. The current step ID of ST2 is stored in context 1466.

The controller switches into context 1466 and starts running TestSub again, which takes Branch 3, displays task view V3, and runs to completion. At this point, the controller switches back to context 1464, restores the current step pointer from context 1464 and resumes the 1$^{st}$ level subtask. The current step pointer is momentarily updated to point to ST2, which is executed (only for evaluating the output argument and condition branches) in the context of the 1$^{st}$ level subtask (context ID 1). The controller then displays task view V2 and runs the subtask to its completion.

The controller switches back to the main task with context 1462, restores the current step pointer from context 1462 and resumes the main task. The current step pointer is momentarily updated to point to ST1, which executes (only for evaluating the output argument and condition branches) in the context of the main task (i.e. context ID 0). The controller then displays task view V1 and runs the main task to its completion.

In one embodiment, the navigation stack stores the current context ID with the step frames. When navigating forward, a task instance may switch context when encountering a Subtask step (entering a subtask), or an End step (exiting a subtask). When navigating backward, a task instance may switch context when traversing through an End step (re-entering a subtask), or a Subtask step (exiting a subtask to re-enter the parent task). When navigating backward out of a subtask, the Start step of the subtask may be moved to the forward stack. After that, if navigation takes an alternative path, contexts associated with all Start steps on the forward navigation stack can be freed.

In one embodiment, the navigation process is optimized to reduce memory consumption of invocation contexts that are no longer needed. In particular, when navigating in the forward direction, if the controller encounters view steps that have 'disable previous' flag set, the controller can free all bookmarks in the navigation stack below the view step, and free all invocation contexts of subtasks that have completed before the view step. This can be achieved by traversing the backward navigation stack and freeing all the contexts associated with end steps on the stack before the view.

Figure 15:
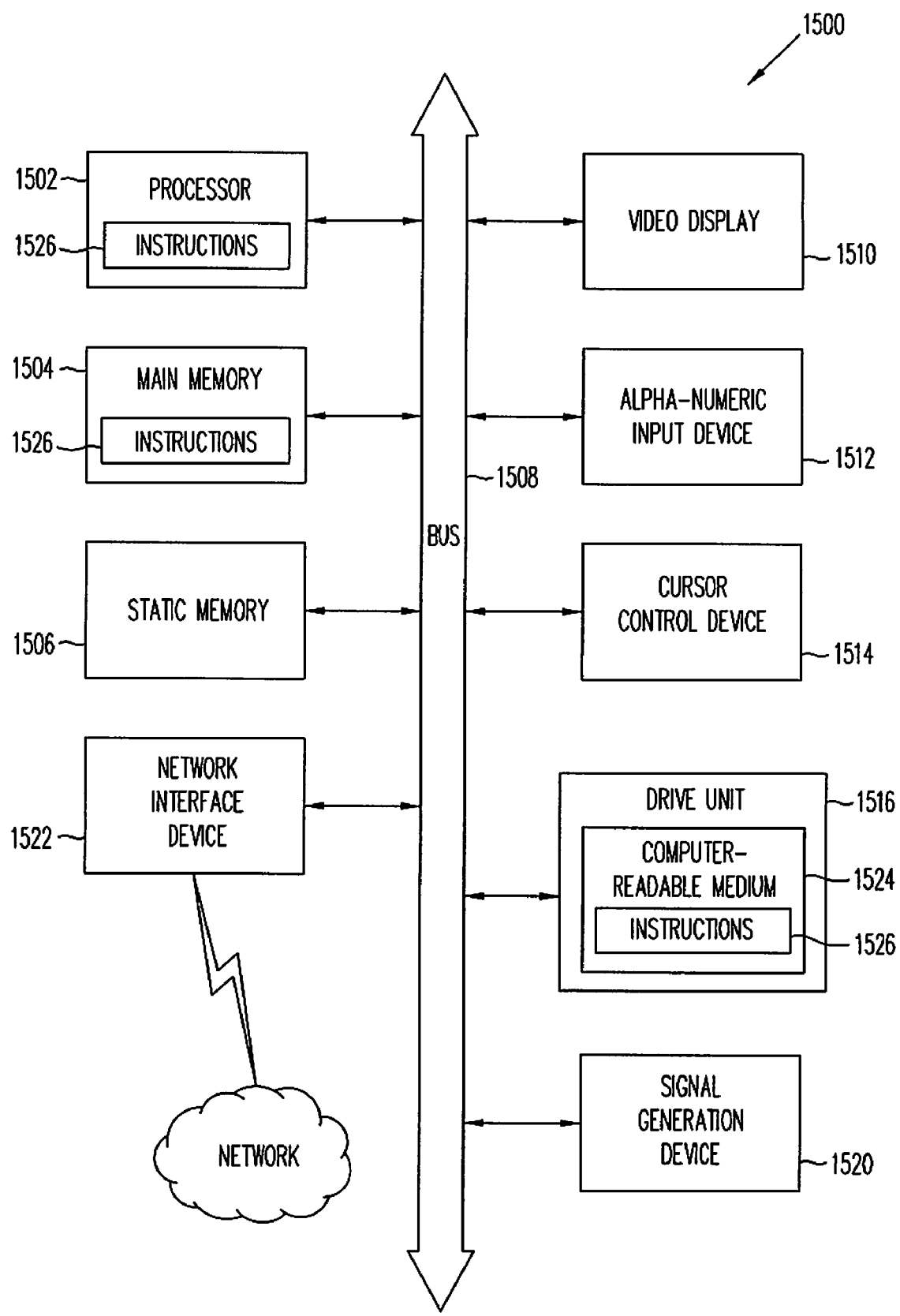
FIG. 15 is a block diagram of an exemplary computer system that may be used to perform one or more of the operations described herein.

FIG. 15 is a block diagram of an exemplary computer system 1500 (e.g., a computer system hosting task controller 204 and/or UI manager 202 of FIG. 2 and/or task UI development tool 102 of FIG. 1) that may be used to perform one or more of the operations described herein. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 1500 includes a processor 1502, a main memory 1504 and a static memory 1506, which communicate with each other via a bus 1508. The computer system 1500 may further include a video display unit 1510 (e.g., a liquid crystal display (LCD) or a cathode ray tube (CRT)). The computer system 1500 also includes an alpha-numeric input device 1512 (e.g., a keyboard), a cursor control device 1514 (e.g., a mouse), a disk drive unit 1516, a signal generation device 1520 (e.g., a speaker) and a network interface device 1522.

The disk drive unit 1516 includes a computer-readable medium 1524 on which is stored a set of instructions (i.e., software) 1526 embodying any one, or all, of the methodologies described above. The software 1526 is also shown to reside, completely or at least partially, within the main memory 1504 and/or within the processor 1502. The software 1526 may further be transmitted or received via the network interface device 1522. For the purposes of this specification, the term "computer-readable medium" shall be taken to include any medium that is capable of storing or encoding a sequence of instructions for execution by the computer and that cause the computer to perform any one of the methodologies of the present invention. The term "computer-readable medium" shall accordingly be taken to include, but not be limited to, solid-state memories, optical and magnetic disks, and carrier wave signals.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. A computerized method comprising:
   providing a plurality of user interfaces (UIs) pertaining to a business task, wherein
      the business task comprises
         a subtask,
      the subtask comprises
         at least one subtask step,
      the subtask is defined within the business task, and
      the subtask is configured to reuse a portion of another business task; and
   allowing navigation through the plurality of UIs, wherein
      the navigation comprises bi-directional navigation, and
      the bi-directional navigation is facilitated by
         maintaining one or more local variables of a first invocation of the subtask, wherein
            the one or more local variables are maintained after the first invocation is completed,
         storing navigation history data in a navigation stack, wherein
            the navigation history data comprises
               an identifier of each of the at least one business subtask step traversed during the navigation, and
               an identifier of a local context associated with the each of the at least one business subtask step traversed during the navigation, and
         defining a context chain by storing a parent context identifier of a parent of the subtask in a local context of the subtask, wherein
            the context chain is configured to be used as a logical call stack.

2. The method of claim 1, wherein the subtask further comprises:
   a predefined reusable module.

3. The method of claim 1, wherein
   the subtask is defined within the business task by in a design environment, and
   the design environment is configured to allow a definition of the subtask within the business task without programming code being written.

4. The method of claim 3, wherein providing the plurality of UIs pertaining to the business task comprises:
   identifying a collection of metadata created for the business task using
      a visual representation of the business task, and
      properties associated with corresponding steps within the business task, wherein
         the design environment is further configured to allow specification of
            the visual representation, and
            the properties; and
   processing the collection of metadata to provide the plurality of UIs pertaining to the business task.

5. The method of claim 1, wherein the subtask is defined within the business task, and a process of the subtask being defined is transparent to a user performing the navigation.

6. The method of claim 5, wherein bi-directional navigation is further facilitated by
receiving a previous operation request;
determining that a local context identifier from a top step frame in a backward navigation stack is the same as a current local context identifier; and
adding a current step frame to a forward navigation stack.

7. The method of claim 6, wherein the bi-directional navigation is further facilitated by
determining that the local context identifier from the top step frame in the backward navigation stack is not the same as the current local context identifier;
switching the local context; and
adding the current step frame to the forward navigation stack.

8. The method of claim 1, wherein the bi-directional navigation is further facilitated by
invoking the subtask.

9. The method of claim 1, wherein the bi-directional navigation is further facilitated by
accessing the one or more local variables pertaining to the first invocation of the subtask during a second invocation of the subtask.

10. The method of claim 1, wherein the bi-directional navigation is further facilitated by
re-entering or exiting the subtask through any one of a previous operation or a next operation.

11. The method of claim 10, wherein the re-entering or exiting the subtask comprises:
storing an execution path of the business task;
determining whether the execution path has changed; and
determining, based on an execution plan change, whether
local variables pertaining to a previous subtask invocation are to be utilized, or
new local variables are to be created.

12. The method of claim 11, wherein
storing the execution path comprises
storing a first portion of the navigation history in a forward navigation history stack, and
storing a second portion of the navigation history in a backward navigation stack; and
determining whether the execution path has changed comprises
comparing a next step to be executed with a top step frame on the forward navigation history stack.

13. The method of claim 11, wherein the re-entering or exiting the subtask further comprises:
creating a local context for the subtask step;
adding an identifier of the subtask and an identifier of the local context associated with the subtask step to the navigation stack; and
switching to the local context associated with the subtask step.

14. A machine-readable storage medium having executable instructions to cause a machine to perform a method comprising:
providing a plurality of user interfaces (UIs) pertaining to
a business task, wherein
the business task comprises
a subtask,
the subtask comprises
at least one subtask step,
the subtask step is defined within the business task and
the subtask is configured to reuse a portion of another business task; and
allowing navigation through the plurality of UIs, wherein
the navigation comprises bi-directional navigation, and
the bi-directional navigation is facilitated by
maintaining one or more local variables of a first invocation of the subtask, wherein
the one or more local variables are maintained after the first invocation is completed,
storing navigation history data in a navigation stack, wherein
the navigation history data comprises
an identifier of each of the at least one business subtask step traversed during the navigation, and
an identifier of a local context associated with the each of the at least one business subtask step traversed during the navigation, and
defining a context chain by storing a parent context identifier of a parent of the subtask in a local context of the subtask, wherein
the context chain is configured to be used as a logical call stack.

15. The machine-readable storage medium of claim 14, wherein
the subtask is defined within the business task, and
a process of the subtask being defined is transparent to a user performing the navigation.

16. The machine-readable storage medium of claim 15, wherein the bi-directional navigation is further facilitated by
invoking the subtask; and
accessing the one or more local variables pertaining to the first invocation of the subtask during a second invocation of the subtask.

17. A system comprising:
at least one processor; and
a runtime engine configured to be executed by the at least one processor to
provide a plurality of user interfaces (UIs) pertaining to
a business task, wherein
the business task comprises
a subtask,
the subtask comprises
at least one subtask step,
the subtask is defined within the business task, and
the subtask is configured to reuse a portion of another business task, and
allow navigation through the plurality of UIs, wherein
the navigation comprises bi-directional navigation,
the runtime engine is configured to facilitate the bi-directional navigation by virtue of being configured to
maintain one or more local variables of a first invocation of the subtask, wherein
the one or more local variables are maintained after the first invocation is completed, and
the runtime engine comprises
a navigation stack, wherein
the navigation stack is configured to store navigation history data, and
the navigation history data comprises
an identifier of each of the at least one business subtask step traversed during the navigation, and
an identifier of a local context associated with the each of the at least one business subtask step traversed during the navigation, and
a context chain, wherein
the context chain is configured to be used as a logical call stack by virtue of being configured to store a parent context identifier of a parent of the subtask in a local context of the subtask.

18. The system of claim 17, wherein a process of the subtask being defined is transparent to the a user performing the navigation.

19. The system of claim 17, wherein the context chain is formed from a chain of local contexts created for each subtask invocation, and each local context in the context chain is configured to store a parent context identifier of a parent of the each subtask.

* * * * *